US012619981B1

(12) United States Patent
Levine et al.

(10) Patent No.: US 12,619,981 B1
(45) Date of Patent: May 5, 2026

(54) SYSTEM AND METHOD FOR REVENUE PARTICIPATION VIA SMART REFERRAL AND COMMISSION TRACKING

(71) Applicants: Ari Kyle Levine, Santa Monica, CA (US); Jason Ling, Sherman Oaks, CA (US); Jamie Tian, Sherman Oaks, CA (US); Joshua Spooner, Los Angeles, CA (US)

(72) Inventors: Ari Kyle Levine, Santa Monica, CA (US); Jason Ling, Sherman Oaks, CA (US); Jamie Tian, Sherman Oaks, CA (US); Joshua Spooner, Los Angeles, CA (US)

( * ) Notice: Subject to any disclaimer, the term of this patent is extended or adjusted under 35 U.S.C. 154(b) by 0 days.

(21) Appl. No.: 19/172,133

(22) Filed: Apr. 7, 2025

(51) Int. Cl.
| | |
|---|---|
| *G06Q 30/0214* | (2023.01) |
| *G06Q 20/36* | (2012.01) |
| *G06Q 20/38* | (2012.01) |

(52) U.S. Cl.
CPC ..... *G06Q 20/3823* (2013.01); *G06Q 20/3674* (2013.01); *G06Q 30/0214* (2013.01)

(58) Field of Classification Search
CPC ........... G06Q 20/3823; G06Q 20/3674; G06Q 30/0214
See application file for complete search history.

(56) References Cited

U.S. PATENT DOCUMENTS

| 10,540,654 B1 * | 1/2020 | James | ................. | G06Q 20/223 |
|---|---|---|---|---|
| 2023/0040773 A1 * | 2/2023 | Dalton | ................. | G06Q 20/227 |

FOREIGN PATENT DOCUMENTS

CN 116433079 A * 7/2023 ....... G06Q 10/06393

OTHER PUBLICATIONS

"Privacy-Preserving Computation for Peer-to-Peer Energy Trading on a Public Blockchain", Dan Mitrea, May 10, 2023, Sensors (Year: 2023).*

* cited by examiner

*Primary Examiner* — Duan Zhang

(57) ABSTRACT

A system and method for token-based revenue participation through smart referral and commission tracking. The system implements cryptographically secure digital certificates representing contributor value in multi-party transactions across various industries. Key components include: a commission allocation engine that programmatically directs transaction revenue to a reward pool; a token acquisition module implementing multi-parametric optimization for cost-efficient token purchases; a digital certificate issuance module generating non-fungible tokens with standardized metadata for contributions; a reward distribution algorithm applying parameterized time-decay functions to certificate values; and a royalty enforcement module that monitors transfers and enforces compliance. The system reduces computational complexity from $O(n^2)$ to $O(\log n)$ for multi-party attribution, implements programmable time-decay valuation, and creates cross-platform portable contribution records. The protocol-agnostic architecture supports multiple distributed ledger technologies through a unified abstraction layer, enabling consistent business logic across heterogeneous blockchain environments.

18 Claims, 10 Drawing Sheets

DeRev System Architecture

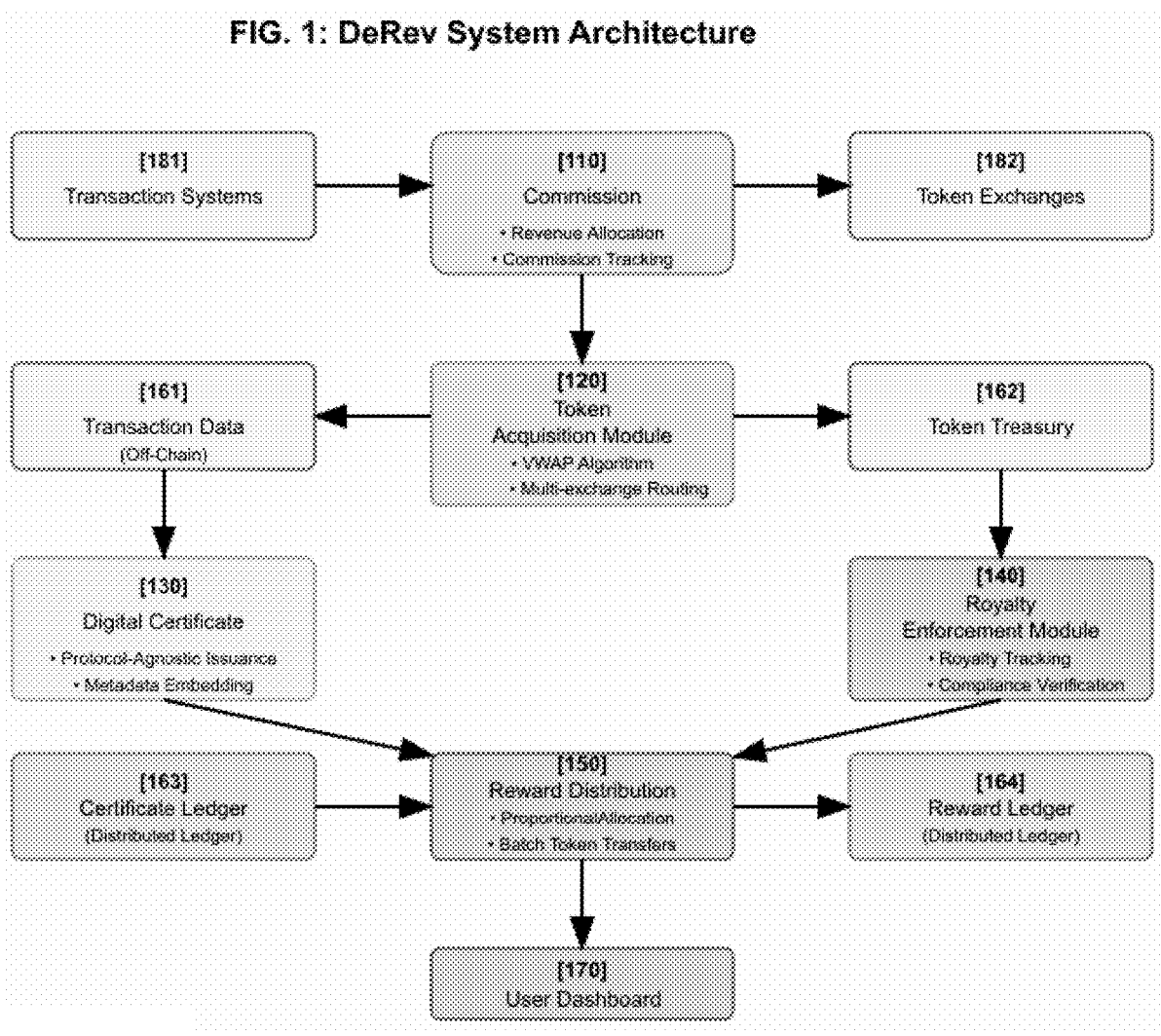
FIG. 1: DeRev System Architecture

Figure 2:
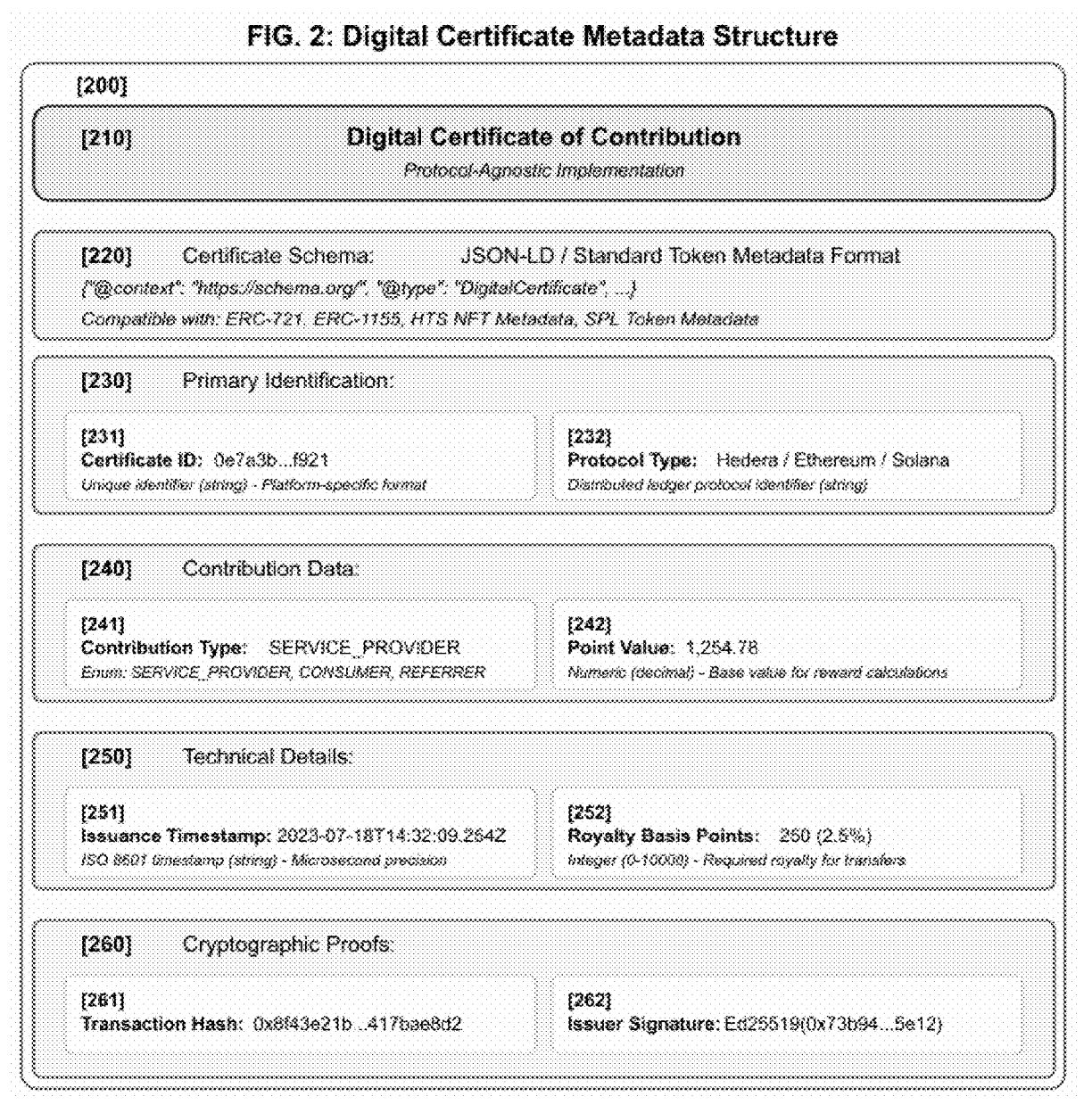

FIG. 2: Digital Certificate Metadata Structure

[200]

[210] Digital Certificate of Contribution
*Protocol-Agnostic Implementation*

[220] Certificate Schema:     JSON-LD / Standard Token Metadata Format
*{"@context": "https://schema.org/", "@type": "DigitalCertificate", ...}*
*Compatible with: ERC-721, ERC-1155, HTS NFT Metadata, SPL Token Metadata*

[230] Primary Identification:

[231]
Certificate ID: 0e7a3b...f921
*Unique identifier (string) - Platform-specific format*

[232]
Protocol Type: Hedera / Ethereum / Solana
*Distributed ledger protocol identifier (string)*

[240] Contribution Data:

[241]
Contribution Type: SERVICE_PROVIDER
*Enum: SERVICE_PROVIDER, CONSUMER, REFERRER*

[242]
Point Value: 1,254.78
*Numeric (decimal) - Base value for reward calculations*

[250] Technical Details:

[251]
Issuance Timestamp: 2023-07-18T14:32:09.264Z
*ISO 8601 timestamp (string) - Microsecond precision*

[252]
Royalty Basis Points: 250 (2.5%)
*Integer (0-10000) - Required royalty for transfers*

[260] Cryptographic Proofs:

[261]
Transaction Hash: 0x8f43e21b...417bae8d2

[262]
Issuer Signature: Ed25519(0x73b94...5e12)

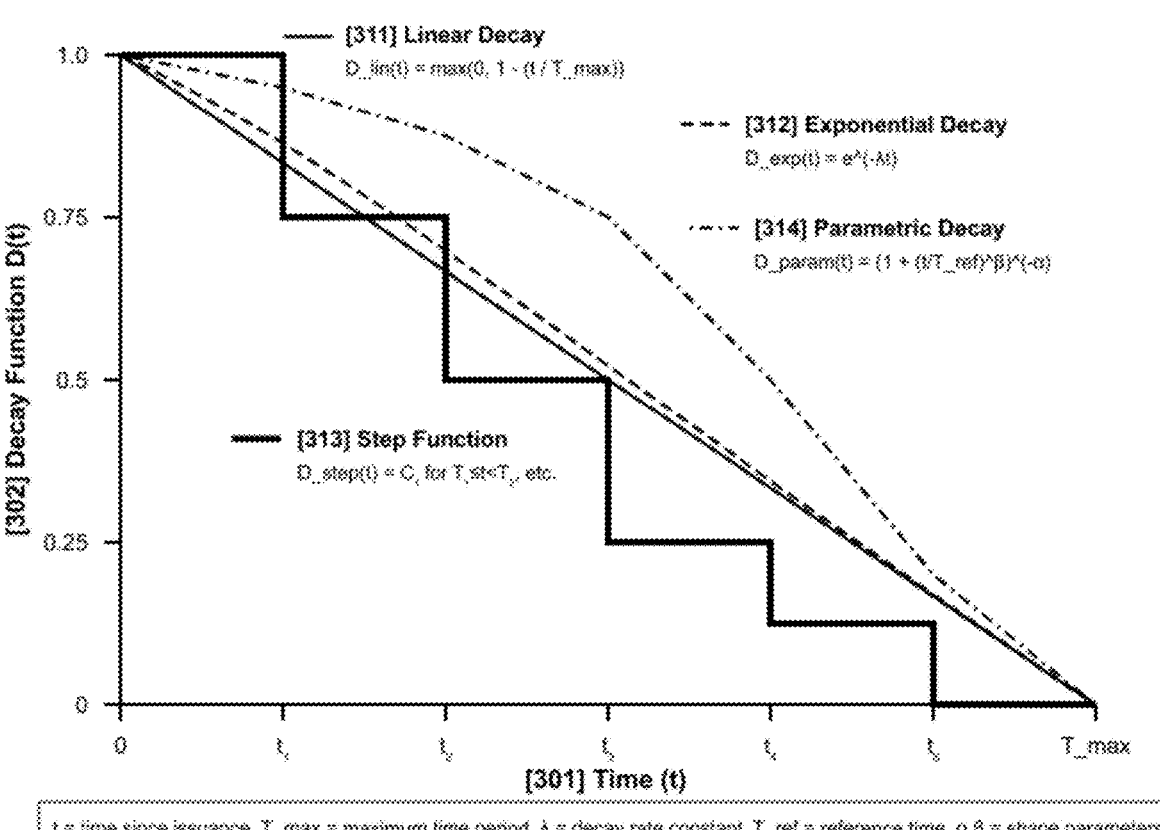
Figure 3: Time-Decay Functions [300]

FIG. 4: Protocol Abstraction Layer

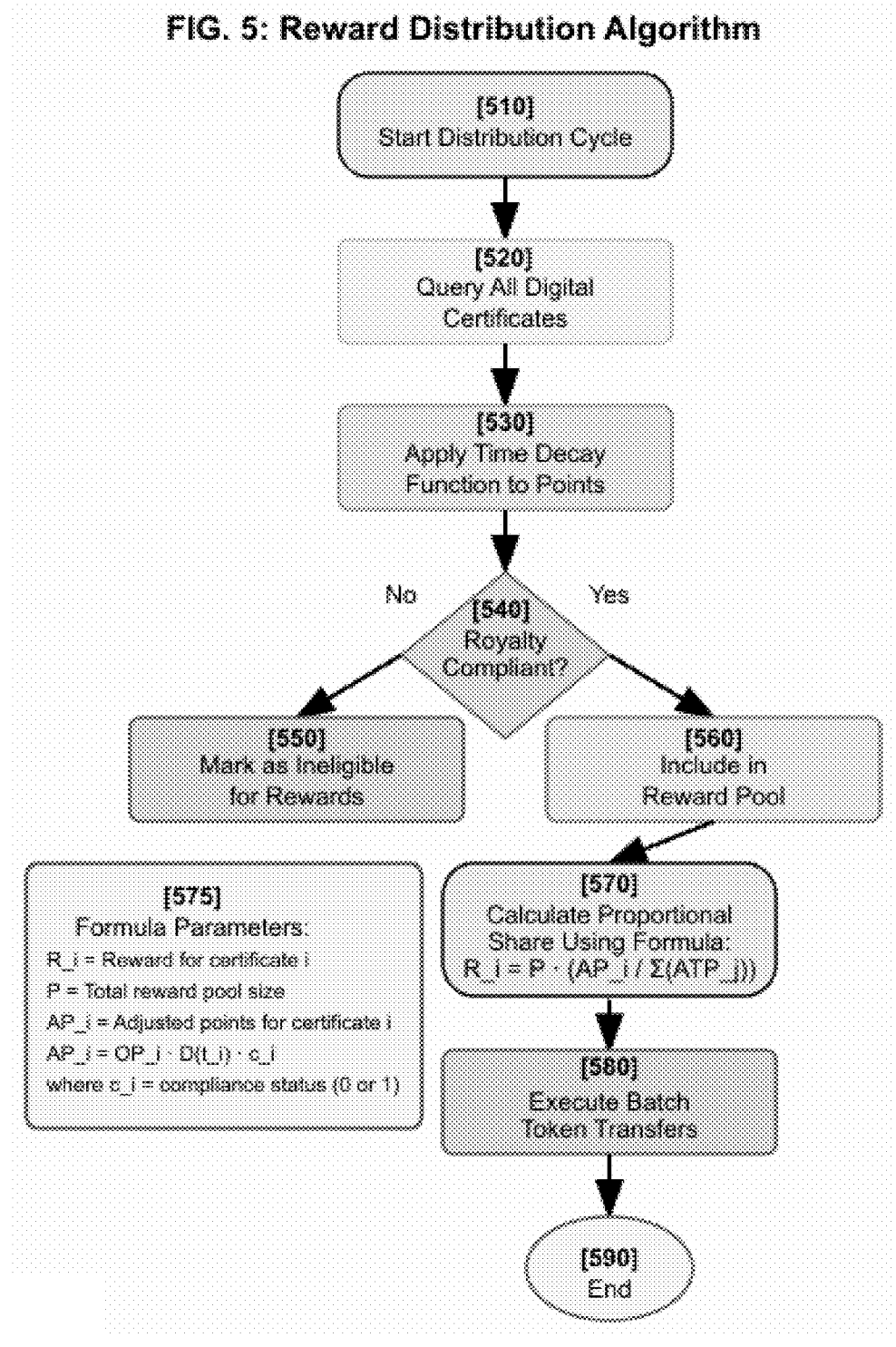
FIG. 5: Reward Distribution Algorithm

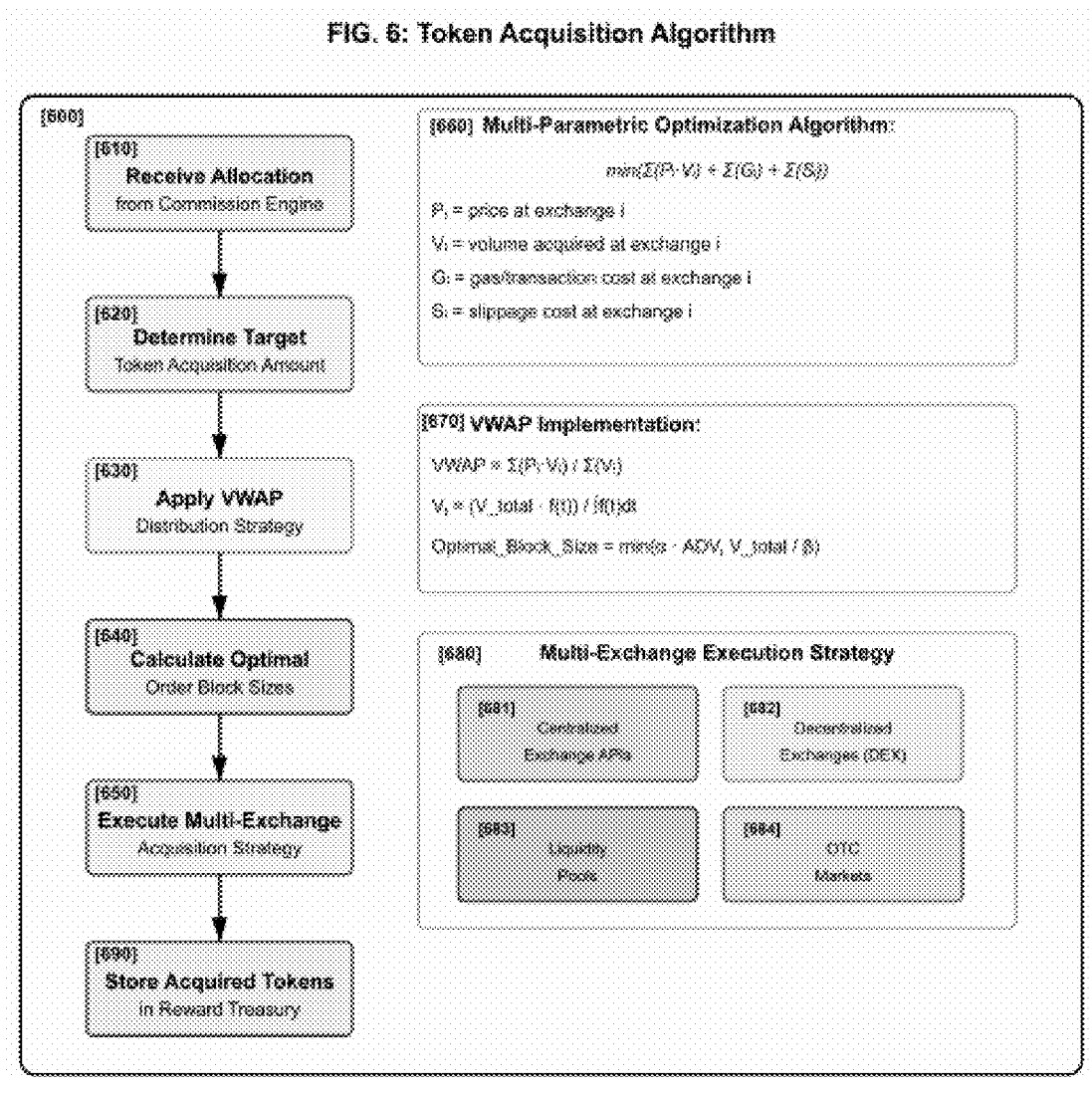
FIG. 6: Token Acquisition Algorithm

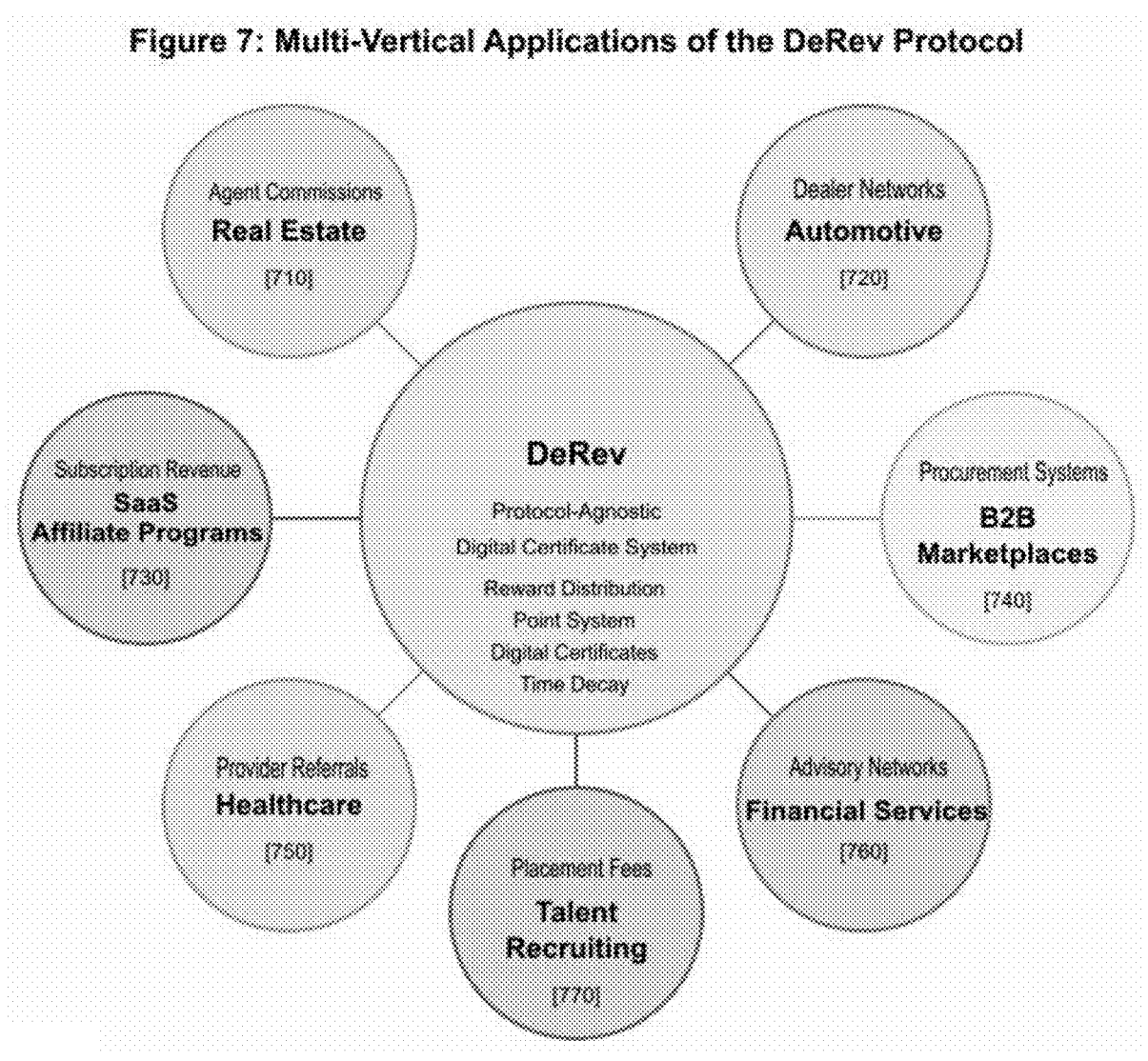
Figure 7: Multi-Vertical Applications of the DeRev Protocol

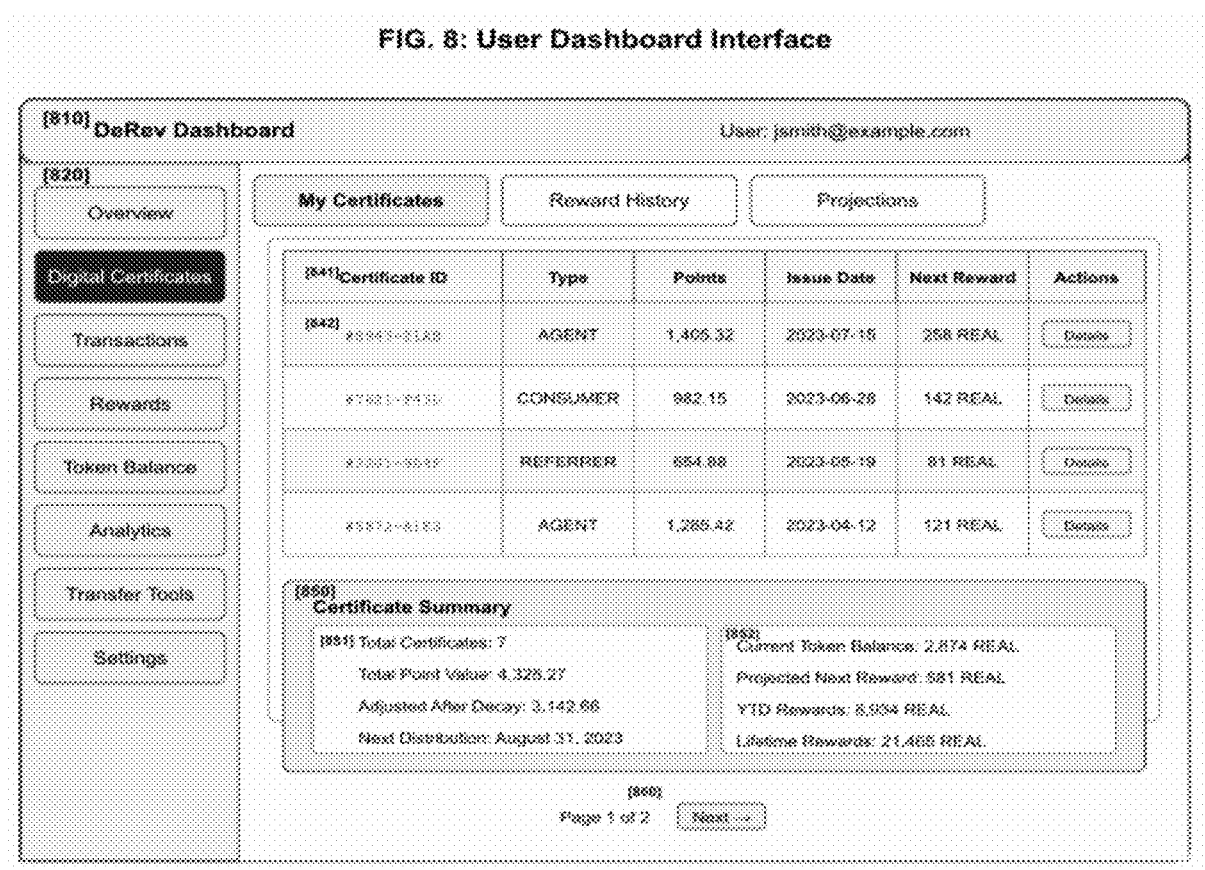
FIG. 8: User Dashboard Interface

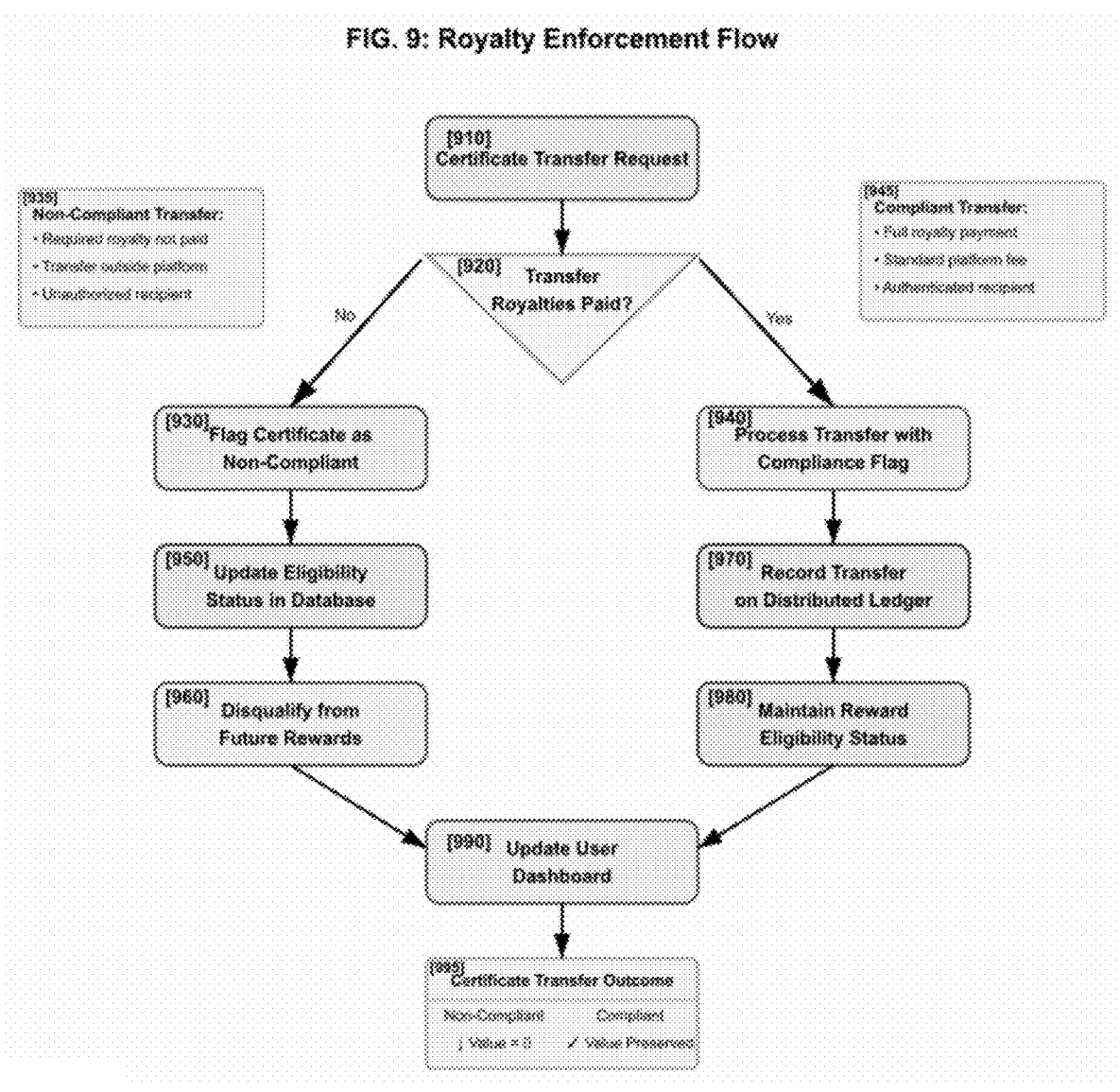
FIG. 9: Royalty Enforcement Flow

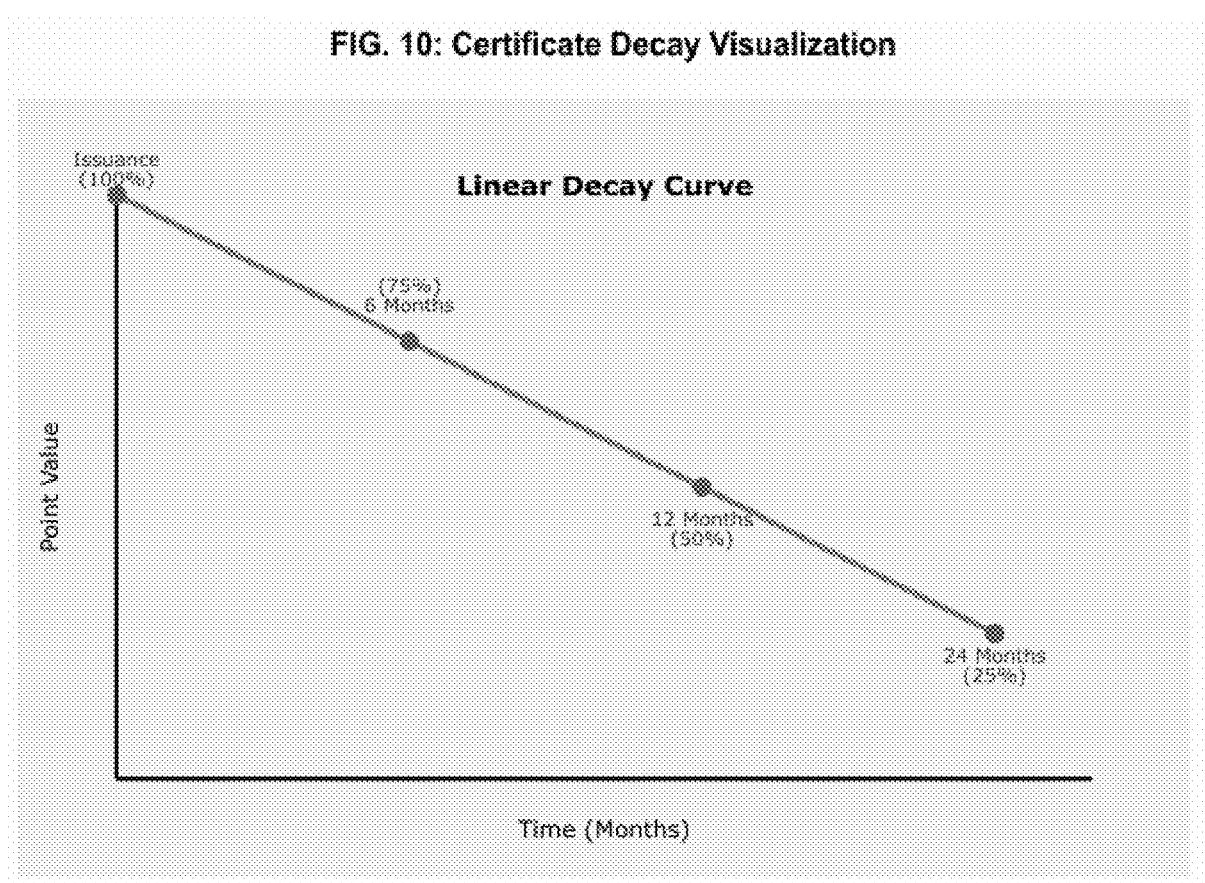
FIG. 10: Certificate Decay Visualization

SYSTEM AND METHOD FOR REVENUE PARTICIPATION VIA SMART REFERRAL AND COMMISSION TRACKING

CROSS-REFERENCE TO RELATED APPLICATIONS

This application claims the benefit of U.S. Provisional Patent Application No. 63/637,059, filed Apr. 22, 2024, entitled "Decentralized Revenue System and Method," the contents of which are incorporated herein by reference. This non-provisional application does not rely on any DAO governance or decentralized autonomous organization infrastructure.

FIELD OF THE INVENTION

The present invention relates to systems and methods for enabling token-based revenue participation through cryptographically secure referral attribution, commission allocation, Digital Certificate-linked contribution tracking, and hybrid on-chain/off-chain reward disbursement.

PRIOR ART

Several existing systems and technologies have attempted to address aspects of referral tracking and commission allocation using both centralized and decentralized approaches:

Traditional Centralized Referral Systems: As documented in US Patent Application Publication No. 20190318433 (McGee et al.), these systems utilize centralized relational databases with HTTP cookie tracking and UTM parameters for attribution. While functional, they lack cryptographic verification capabilities, rely on mutable database entries, and cannot provide independent verification through consensus mechanisms or cryptographic proofs.

Blockchain-Based Token Rewards: Prior implementations such as US Patent Application Publication No. 20180322597 (Sher) explore using blockchain for real estate transactions but focus primarily on disintermediating agents rather than enhancing attribution capabilities through cryptographically secure commission tracking. These systems implement basic commission distribution on single blockchains and explore using fungible tokens for rewards, but fail to address cross-chain operability.

Time-Decay Value Systems: Alternative currency designs and community contribution scoring systems, as seen in US Patent Application Publication No. 20120221390 (Codey), have implemented basic time-based value decay in limited contexts. However, these approaches lack the computational efficiency and temporal value adjustment capabilities necessary for accurate multi-party contribution valuation with mathematical rigor.

Certificate-Based Authentication: Non-fungible tokens have been used as certificates of ownership or authentication in various contexts, such as in US Patent Application Publication No. 20200410590 (Regmi et al.), which describes blockchain-based systems for environmental transactions. However, these implementations do not address the specific computational challenges of multi-party commission attribution with temporal value decay.

Manual Reconciliation Methods: Prior implementation attempts have included manual reconciliation through spreadsheet calculations, which exhibit $O(n^2)$ computational complexity when calculating attributions across complex hierarchies, creating significant performance bottlenecks at scale.

Data Structure Incompatibility: Existing solutions maintain contribution data in proprietary, non-interoperable data structures that prevent cross-platform persistence of contribution metrics, lacking standardized metadata schemas necessary for programmatic interpretation across systems.

These disparate approaches have failed to address the fundamental technical challenges of cross-chain operability, computational efficiency at scale, secure data partitioning, and programmable time-based value adjustment in a unified system.

BACKGROUND OF THE INVENTION

Traditional referral programs and commission-based incentive systems suffer from significant technical deficiencies that impair their functionality, accuracy, and interoperability. These systems, typically built on centralized database architectures with limited computational capabilities, exhibit several critical technical limitations:

Cryptographic verification deficiency: Existing systems lack immutable, cryptographically secured transaction records, relying instead on mutable database entries that cannot be independently verified through consensus mechanisms or cryptographic proofs, resulting in verification asymmetry between platform operators and participants.

Computational inefficiency in multi-party attribution: Current algorithmic approaches to multi-party commission calculations exhibit $O(n^2)$ complexity in participant relationships, creating processing bottlenecks when computing weighted distributions across complex transaction hierarchies with interdependent contribution factors.

Temporal time-decay computation absence: Legacy systems implement static temporal models that fail to incorporate programmable time-decay functions necessary for mathematically sound representation of diminishing contribution value over time, resulting in computationally inaccurate reward distributions that do not reflect real-world value degradation patterns.

Heterogeneous data structure incompatibility: Attribution data remains siloed in proprietary, non-interoperable data structures that prevent cross-platform persistence of contribution metrics, lacking standardized metadata schemas necessary for programmatic interpretation across systems.

Distributed verification impossibility: Existing architectures preclude third-party verification of contribution claims due to closed verification pathways that prevent external validation of attribution accuracy, creating trust dependencies rather than cryptographically-enabled trust minimization.

Programmatic compliance enforcement limitations: Manual compliance verification processes cannot scale to handle complex royalty and attribution rules across large transaction volumes, lacking the deterministic execution guarantees provided by programmatic enforcement mechanisms.

Prior blockchain-based referral reward systems were known in the art before mid-2023. Some systems implemented basic commission distribution on single blockchains, while others explored using fungible tokens for rewards. Separately, time-based value decay has been applied in limited contexts such as community contribution scoring and alternative currency designs. Additionally, non-fungible tokens have been used as certificates of ownership or authentication in various contexts. However, these disparate approaches have failed to address the fundamental technical challenges of cross-chain operability, computational efficiency at scale, secure data partitioning, and programmable time-based value adjustment in a unified system.

Prior implementation attempts have included centralized relational databases with limited API access, manual reconciliation through spreadsheet calculations, and rudimentary tracking through HTTP cookies or UTM parameters. These approaches fail to implement the necessary technical capabilities for cryptographically verifiable, computationally efficient, programmatically enforced attribution systems required for modern distributed transaction environments.

Limitations of Existing Approaches

Several existing approaches have attempted to address aspects of these challenges but have failed to provide comprehensive solutions:

Traditional Real Estate Referral Systems: As documented in US Patent Application Publication No. 20190318433 (McGee et al.), these systems rely on centralized databases that cannot provide cryptographic verification of transaction integrity or programmatic enforcement of commission rules.

Decentralized Real Estate Systems: As shown in US Patent Application Publication No. 20180322597 (Sher), these focus primarily on disintermediating agents rather than enhancing their capabilities through cryptographically secure commission attribution.

Non-tokenized Rewards Programs: US Patent Application Publication No. 20120221390 (Codey) describes rewards systems that lack the computational efficiency and temporal value adjustment capabilities necessary for accurate contribution valuation.

Environmental Transaction Systems: US Patent Application Publication No. 20200410590 (Regmi et al.) describes blockchain-based systems for environmental transactions but does not address the specific computational challenges of multi-party commission attribution with temporal value decay.

Additionally, these systems lack the technical ability to represent contribution value as programmable, portable digital assets with inherent compliance mechanisms and time-sensitive valuation algorithms.

The present invention, designated as "DeRev system" (Decentralized Revenue system), addresses the specific technical problems of: (1) $O(n^2)$ computational complexity when calculating multi-party attributions across complex hierarchies, creating performance bottlenecks at scale; (2) inability to maintain consistent metadata schemas across heterogeneous blockchain protocols, resulting in fragmented identity and contribution records; (3) lack of cryptographically secure, programmable temporal value adjustment, creating mathematical inaccuracies in long-term reward distribution; (4) inappropriate storage of sensitive transaction data on public ledgers, creating privacy vulnerabilities; and (5) inability to verify contribution validity without exposing confidential details, preventing compliance verification without compromising data security.

The DeRev system implements a novel technical architecture that overcomes the aforementioned deficiencies through an integrated system of cryptographically secured data structures, programmable decay algorithms, standardized metadata schemas, and distributed verification protocols operating within a dual-layer processing environment.

In the primary embodiment, the DeRev system executes a multi-phase computational workflow that transforms conventional commission transactions into cryptographically verifiable contribution records with programmable value attributes. Upon transaction execution, the system performs the following technical operations:

a. Implements a parameterized allocation algorithm that computes commission distribution across participant addresses according to configurable distribution coefficients stored in a protected parameter store.

b. Executes a deterministic token acquisition function utilizing cryptographically signed API calls to external liquidity sources with price-optimizing execution logic constrained by gas-efficient, multi-exchange routing algorithms.

c. Generates ERC-721/ERC-1155 compatible Digital Certificates with embedded metadata conforming to standardized JSON schemas that encode contribution parameters as verifiable on-chain attributes.

d. Implements cryptographically secured storage of contribution metadata within token structures using the EIP-712 typed data standard, including hierarchical contribution classification, mathematically weighted point values, millisecond-precision temporal data, and compliance status flags.

e. Applies configurable time-decay algorithms to token point values according to parameterized mathematical functions including linear, exponential, logarithmic, and step-function decay models with adjustable coefficients.

f. Executes periodic reward distribution operations utilizing a computationally efficient $O(\log n)$ algorithm that calculates proportional allocations based on the weighted sum of time-adjusted contribution values and cryptographically verifiable compliance states.

The system architecture provides the following technical improvements:

a. Cryptographic attestation: Implementation of EIP-712 typed data signing for tamper-evident, independently verifiable contribution records with cryptographic proof of authenticity.

b. Computational optimization: Reduction of multi-party attribution calculations from $O(n^2)$ to $O(\log n)$ complexity through implementation of merkleized contribution trees and optimized proportional distribution algorithms.

c. Programmable time-decay valuation: Implementation of parameterized mathematical decay functions that programmatically transform token values according to configurable time-decay algorithms with deterministic execution.

d. Standardized metadata interoperability: Development of URI-addressable, JSON-LD compatible metadata schemas that enable cross-platform interpretation of contribution attributes through standardized semantic definitions.

e. Distributed verification protocols: Implementation of zero-knowledge proof systems for selective disclosure verification of contribution parameters without revealing transaction-specific sensitive data.

f. Programmatic enforcement: Execution of smart contract-based compliance verification with deterministic royalty calculation and enforcement through automated eligibility verification algorithms.

Implementation Example

To illustrate the system's operation, consider a real estate transaction where a property sells for $1,000,000 with a 2.5% commission ($25,000). The system would execute the following steps:

```
# Pseudocode for commission allocation
def allocate_commission(transaction):
    # Input validation and signature verification
    validate_transaction_signature(transaction.signature)
    # Calculate agent and platform splits
    agent_commission=transaction.commission_amount*
        AGENT_SPLIT_RATIO # 80%=$20,000
    platform_commission=transaction.commission_
        amount*PLATFORM_SPLIT_RATIO  #  20%=$5,
        000
    # Calculate DeRev allocation
    derev_revenue=platform_commission*REVENUE_
        RATIO # 75%=$3,750
    derev_token_acquisition=platform_commission*
        TOKEN_RATIO # 25%=$1,250
    # Generate cryptographic proof of allocation
    allocation_proof=generate_eip712_proof({
        'transaction_hash': transaction.hash,
        'agent_commission': agent_commission,
        'platform_commission': platform_commission,
        'derev_revenue': derev_revenue,
        'derev_token_acquisition':    derev_token_acquisi-
            tion,
        'timestamp': current_timestamp_ms( )
    })
    return {
        'agent_commission': agent_commission,
        'platform_commission': platform_commission,
        'derev_revenue': derev_revenue,
        'derev_token_acquisition':    derev_token_acquisi-
            tion,
        'allocation_proof': allocation_proof
    }
```

The system would then mint at least two Digital Certificates (one for the agent, one for the buyer/seller) with embedded metadata and execute the token acquisition process using the allocated funds.

BRIEF DESCRIPTION OF DRAWINGS

FIG. 1 is a system architecture diagram illustrating the DeRev system components including Commission Allocation Engine [110], Token Acquisition Module [120], Digital Certificate Issuance Module [130], Royalty Enforcement Module [140], Reward Distribution Algorithm [150], and associated data stores [161-164].

FIG. 2 depicts the Digital Certificate Metadata Structure [200] showing the certificate header [201] and metadata fields including Certificate ID [221], Protocol Type [222], Contribution Type [223], Point Value [224], Issuance Timestamp [225], Royalty Basis Points [226], Transaction Hash [227], and Issuer Signature [228].

FIG. 3 illustrates the Time-Decay Functions [300] with coordinate axes [301-302] and function curves representing Linear Decay [311], Exponential Decay [312], Step Function [313], and Parametric Decay [314] models.

FIG. 4 shows the Protocol Abstraction Layer [400] with DeRev Core Business Logic [410] interfacing with the Protocol Abstraction Layer [420] and multiple protocol implementations including Hedera Hashgraph (Hedera) [431], Ethereum [432], Solana [433], and Other Protocols [434].

FIG. 5 presents the Reward Distribution Algorithm workflow starting with Distribution Cycle [510], proceeding through Certificate Querying [520], Time Decay Application [530] with decay formulas [535], Royalty Compliance Check [540], Eligibility Determination [550-560], Reward Calculation [570] with formula [575], and Token Distribution [580] with ledger recording [585].

FIG. 6 depicts the Token Acquisition Algorithm [600] featuring the Multi-Parametric Optimization Algorithm [610], Acquisition Parameters [620], VWAP Implementation [630], and Multi-Exchange Execution Strategy [640].

FIG. 7 illustrates the Multi-Vertical Applications of the DeRev Protocol-Agnostic Digital Certificate System [700], showing integration with various industries including Real Estate [710], Automotive [720], SaaS & Affiliate Programs [730], B2B Marketplaces [740], Healthcare [750], Financial Services [760], and Talent & Recruiting [770].

FIG. 8 shows the User Dashboard Interface [800] with Dashboard Header [810], Navigation Panel [820], Main Content Area [830], Certificate List [840] with table headers [841] and certificate rows [842], and Certificate Summary [850] displaying statistics [851] and token information [852].

FIG. 9 illustrates the Royalty Enforcement Flow beginning with Certificate Transfer Request [910], Royalty Payment Verification [920], and resulting processes for non-compliant transfers [930, 950, 960] and compliant transfers [940, 970, 980].

FIG. 10 depicts the Certificate Decay Visualization [1000] showing a Digital Certificate [1010], Timeline [1020] with decay milestones at issuance [1031], 6 months [1032], 12 months [1033], and 24 months [1034], with a Linear Decay curve [1040].

DETAILED DESCRIPTION OF THE INVENTION

System Architecture Overview

The DeRev system comprises several integrated components working together to create a secure, transparent, and efficient revenue participation network. FIG. 1 illustrates the high-level system architecture, showing how these components interact to capture, validate, attribute, and reward contributions across multi-party transactions.

The system operates through a series of specialized modules:

Commission Allocation Engine

The Commission Allocation Engine (CAE) [110] is a configurable service that monitors transaction completion events and programmatically directs a portion of earned commissions to a DeRev revenue pool. As depicted in FIG. 1, when a qualifying transaction completes, the CAE:

Receives transaction metadata including total value, commission amount, and participant identifiers.

Applies business-specific allocation rules to determine the DeRev contribution.

Records the allocation in an immutable ledger with cryptographic signatures.

Triggers the Token Acquisition Module to initiate acquisition processes.

The CAE supports variable allocation models including:

Fixed percentage (e.g., 10%, 25%) of total commission

Sliding scale based on transaction value

Formula-based allocation incorporating transaction characteristics

Custom allocation rules defined per business unit or transaction type

For example, in a real estate transaction with a $20,000 commission, the CAE might allocate 25% ($5,000) to the DeRev pool while distributing the remaining 75% through traditional commission channels. This allocation is cryptographically signed and recorded for audit purposes.

The CAE implements error handling for edge cases such as:

```
# Pseudocode for edge case handling in allocation
def handle_allocation_edge_cases(transaction):
    # Handle zero or negative commission amounts
    if transaction.commission_amount <=0:
        raise InvalidCommissionError("Commission amount
            must be positive")
    # Handle transactions with missing participant data
    if not transaction.agent_id:
        log_warning("Transaction missing agent_id, using
            default allocation rules")
        return apply_default_allocation_rules(transaction)
    # Handle multi-agent scenarios with custom split rules
    if transaction.has_multiple_agents( ):
        return apply_multi_agent_allocation_rules(transaction)
    # Standard allocation pathway
    return standard_allocation(transaction)
```

Token Acquisition Module

The Token Acquisition Module (TAM) [120] implements a cryptographically secure interface between fiat commission allocations and the tokenized reward ecosystem through a series of programmatic execution algorithms. As illustrated in FIG. 6, the TAM performs the following technical functions:

Receives digitally signed allocation instructions from the CAE via a TLS 1.3 encrypted communication channel with certificate-based authentication.

Maintains persistent connections to authorized exchange APIs through WebSocket interfaces with periodic reconnection logic and exponential backoff retry algorithms to ensure continuous operational capacity.

Implements a multi-parametric execution algorithm that optimizes token acquisition across the following technical constraints: $\min(\Sigma(P_i \cdot V_i) + \Sigma(G_i) + \Sigma(S_i))$ where: $P_i$=price at exchange i $V_i$=volume acquired at exchange i $G_i$=gas cost for transaction at exchange i $S_i$=slippage cost at exchange i Implements storage of acquired tokens in hierarchical deterministic (HD) wallets using the BIP-32/BIP-39/BIP-44 derivation standards with m-of-n multi-signature security requiring threshold signature consensus for withdrawal operations.

Generates immutable transaction records with cryptographic hash linkage that enables Merkle-proof-based verification of acquisition operations for audit and compliance purposes.

The TAM incorporates the following advanced algorithmic components:

Temporal Execution Algorithm: Implementation of a volume-weighted average price (VWAP) acquisition strategy expressed as: $VWAP = \Sigma(P_i \cdot V_i)/\Sigma(V_i)$ where acquisition volume is distributed temporally according to: $V = (V\_total \cdot f(t))/\int f(t)dt$ with f(t) representing the volume distribution function across time t Order Fragmentation Algorithm: Programmatic division of large orders into optimally sized execution blocks to minimize market impact, computed as: Optimal_Block_Size=$\min(\alpha \cdot ADV, V\_total/\beta)$ where: ADV=average daily volume $\alpha$=configurable coefficient (typically 0.01-0.05) $\beta$=minimum number of execution blocks (typically 5-20)

Route Optimization Algorithm: Implementation of a dynamic programming approach to multi-exchange routing that minimizes weighted cost function across exchanges, considering price, gas fees, and slippage with temporal execution constraints.

Cryptographic Reconciliation System: Automated verification of transaction execution through hash-linked receipt verification and balance attestation utilizing zero-knowledge proofs for privacy-preserving audit capabilities.

This module creates a deterministic, programmatically controlled token demand function directly proportional to transaction volume, implementing a technical mechanism for sustained token economics through algorithmically governed acquisition processes.

Digital Certificate Issuance Module

Figure 4:
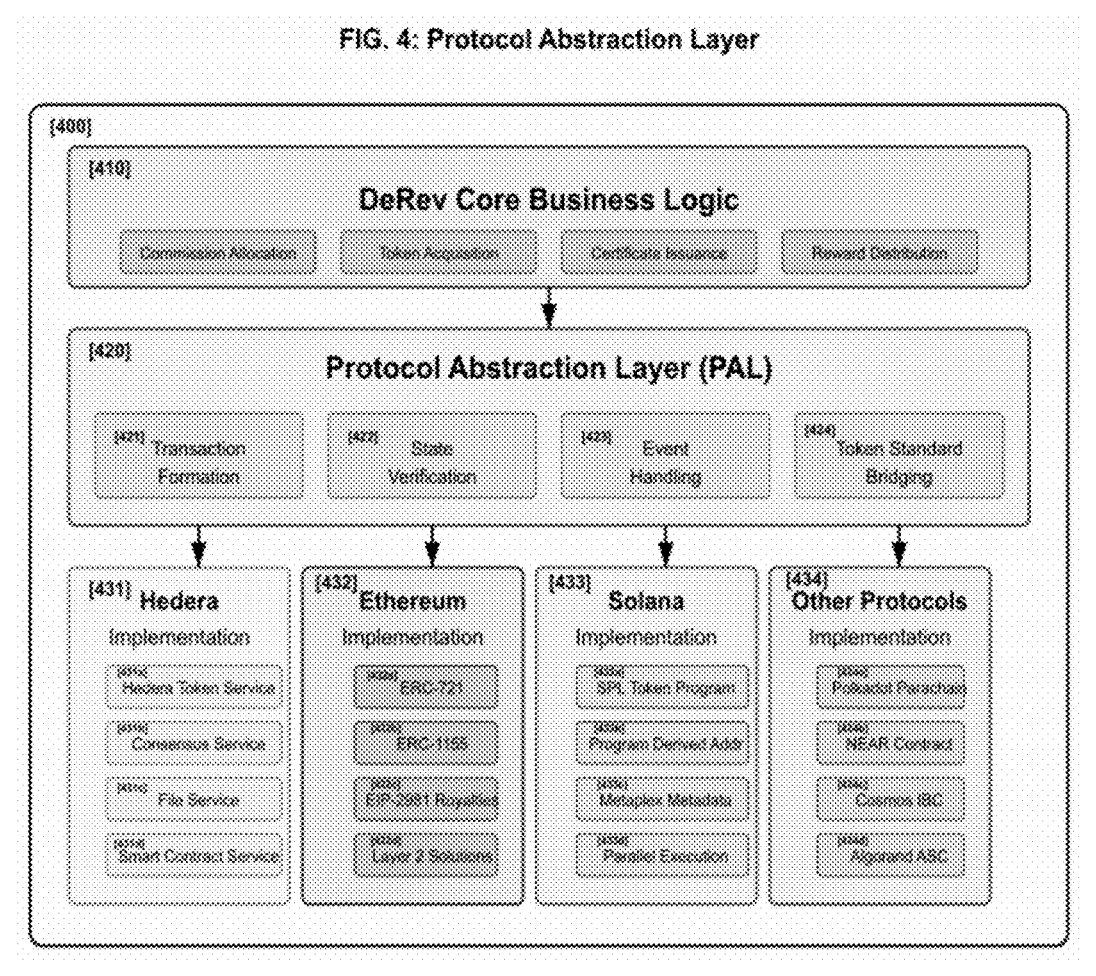

The Digital Certificate Issuance Module (DCIM) [130] implements a protocol-agnostic system for creating cryptographically verifiable digital certificates of contribution when qualifying transactions complete. As illustrated in FIG. 4, this module:

Generates digital tokens according to multiple interoperable token standards, including but not limited to:
    Ethereum-compatible standards (ERC-721, ERC-1155)
    Hedera Token Service (HTS) non-fungible tokens
    Solana Program Library (SPL) tokens
    Other distributed ledger token implementations supporting non-fungible attributes
Establishes cryptographically verifiable ownership records through:
    Public-key based addressing compatible with multiple cryptographic curves (secp256k1, Ed25519)
    Transaction-specific provenance linking through cryptographic hash functions (SHA-256, SHA-3)
    Cross-chain credential verification using protocol-appropriate signature schemes
Implements a standardized metadata schema with the following technical components:
Contribution Type Classifier Using Hierarchical Taxonomy Codes
    Numerical point value derived from transaction parameters
    ISO 8601 extended format timestamp with microsecond precision
    Protocol-specific transaction identifier with cryptographic binding
    Royalty configuration parameters expressed as basis points
    Issuer signature using protocol-appropriate signing algorithms
For each qualifying transaction, the DCIM generates contribution certificates for key transaction participants:
    Service Provider Certificate: Issued to transaction facilitators or agents
    Consumer Certificate: Issued to transaction principals (buyers/sellers/users)
    Referrer Certificate: Issued to transaction originators or lead sources
The metadata structure follows a standardized JSON-LD schema with the following technical implementation:

```
{
"@context": "https://schema.org/",
"@type": "DigitalCertificate",
"certificateType": "[SERVICE_PROVIDER ICONSUMER REFERRER]",
"pointValue": <numeric_value>,
"issuanceTimestamp": "<ISO8601_timestamp>",
"transactionDigest": "<hash_digest>",
"royaltyBasisPoints": <numeric_value>,
"issuerSignature": "<cryptographic_signature>",
"protocol": "<blockchain_protocol>",
"protocolVersion": "<version_string>",
"additionalAttributes": {
```

```
// Protocol-specific extended attributes
    }
}
```

The metadata schema is designed for cross-protocol portability, with extended attribute fields accommodating protocol-specific requirements such as Hedera's memo field constraints, Ethereum's gas optimization considerations, or Solana's account structure requirements.

The DCIM implements protocol-specific optimizations including:

Batched token minting for gas/fee efficiency

Sharded metadata storage for oversized attribute sets

Merkle-based verification for cross-chain references

Protocol-appropriate signature schemes (ECDSA, EdDSA)

This modular, protocol-agnostic design enables the system to operate across multiple blockchain ecosystems while maintaining consistent business logic and metadata semantics regardless of the underlying distributed ledger technology.

Reward Distribution Algorithm

The Reward Distribution Algorithm (RDA) [150] implements a computationally efficient distribution mechanism that determines each contributor's proportional allocation from the reward pool through a multi-stage algorithmic process. As illustrated in FIG. 5, the RDA executes the following computational sequence:

Implements a recursive Merkle tree query to retrieve all eligible Digital Certificates with O(log n) complexity, utilizing pagination and sharding techniques to optimize data retrieval across distributed storage nodes.

Applies parameterized time-decay functions to each Digital Certificate's point value according to the following algorithmic models:

For linear decay:

$$D\_lin(t)=\max(0,1-(t/T\_max))$$

where:

t=current_timestamp−issuance_timestamp (in seconds)
T_max=maximum time period for decay (in seconds)
b. For exponential decay:

$$D\_exp(t)=e^{\wedge}(-\lambda t)$$

where:

$\lambda$=decay rate constant defined as $\ln(2)/t\_half$ t_half=half-life period (in seconds)

For multi-phase step function:

$$D\_step(t)=\{1.0 \text{ if } t<T_1 \text{ } C_1 \text{ if } T_1 \leq t<T_2 C_2 \text{ if } T_2 \leq t \leq T_3 \ldots . C_n \text{ if } t \geq T_n\}$$

where:

$T_i$=threshold timestamps $C_i$=coefficient values $(0 \leq C_i \leq 1)$
For generalized parametric decay:

$$D\_Param(t)=(1+(t/T\_Ref)^{\wedge}\beta)^{\wedge}(-\alpha)$$

where:

T_ref=reference time period $\alpha,\beta$=shape parameters controlling decay characteristics Executes cryptographic verification of royalty compliance status utilizing a binary eligibility function:

$$\varepsilon(Certificate\_id)=\{1 \text{ if } compliance\_verification(Certificate\_id)=TRUE \text{ } 0 \text{ otherwise}\}$$

Implements an optimized proportional allocation algorithm with computational complexity O(n) to determine reward distribution:

$$R\_i=P-AP\_i/(\Sigma_j AP\_j)$$

where

R_i=reward amount for Certificate_i P=total reward pool size AP_i=$\varepsilon$(Certificate_i)·OP_i·D(t_i) OP_i=original point value assigned to Certificate_i D(t_i)=selected decay function applied to time since issuance Executes batched token transfer operations utilizing ERC-20 standard transferFrom( ) method with gas optimization through:

Merkleized proof of allocation for batch verification

Optimized transaction ordering to minimize state changes

Implementation of EIP-1155 batch transfer for compatible Digital Certificates

The algorithm incorporates the following computational optimizations:

Sparse Tree Indexing: Implementation of a sparse Merkle tree for efficient look-up of eligible Digital Certificates with O(log n) complexity, as specifically defined in the following algorithm:

```
# Implementation of sparse Merkle tree for O(log n)
    certificate lookup
def query_eligible_certificates(distribution_cycle, pag-
    e_size=100):
    """"
    Efficiently query eligible certificates using sparse
        Merkle tree
    with O(log n) complexity
    Args:
        distribution_cycle: Current distribution cycle identi-
            fier
        page_size: Number of certificates to retrieve per
            page
    Returns:
        List of eligible certificate IDs
    """"
    # Initialize results and pagination
    all_certificates=[ ]
    current_page=0
    total_pages=None
    while        total_pages        is        None        or
        current_page<total_pages:
        # Compute Merkle proof path for current page
        proof_path=compute_merkle_proof_path(
            root=get_certificates_merkle_root( ),
            page=current_page,
            page_size=page_size
        )
        # Retrieve certificates at this page with proof veri-
            fication
        page_result=query_certificates_page(
            proof_path=proof_path,
            page=current_page,
            page_size=page_size
        )
            # Verify the Merkle proof to ensure data integrity
            if not verify_merkle_proof(
        proof=page_result.proof,
        root=get_certificates_merkle_root( )
    ):
        raise  InvalidMerkleProofError("Certificate  query
            returned invalid proof")
    # Add certificates to results
    all_certificates.extend(page_result.certificates)
    # Update pagination info
    current_page+=1
    if total_pages is None:
        total_pages=page_result.total_pages
    return all_certificates
```

This implementation achieves O(log n) complexity by leveraging the properties of Merkle trees, which allow for efficient verification of data inclusion with logarithmic time complexity relative to the total number of certificates in the system.

Parallel Computation: Distribution of decay function calculations across multiple execution threads with synchronized aggregation.

Numerical Precision Management: Implementation of fixed-point arithmetic with 18 decimal places to prevent rounding errors during allocation calculations.

Gas Optimization: Batching of on-chain distribution transactions to minimize gas costs through:

$$\text{Gas\_saved}=(G\_base+G\_data\text{-}n)-(n\cdot(G\_base+G\_data))$$

where:

G_base=base gas cost per transaction G_data=marginal gas cost per data byte n=number of recipients State Caching: Implementation of a two-level caching system for Digital Certificate state to minimize redundant blockchain queries with an invalidation strategy based on block confirmation counts.

The RDA executes on a deterministic schedule through a time-locked smart contract that triggers distribution cycles according to the consensus timestamp of predefined block heights. All distribution operations generate cryptographically verifiable execution records maintained in an append-only log structure with tamper-evident properties guaranteed through sequential hash linking.

Royalty Enforcement Module

The Royalty Enforcement Module (REM) monitors and enforces adherence to predefined royalty rules when Digital Certificates transfer between wallets. As depicted in FIG. 9, the REM:

Continuously monitors Digital Certificate transfer events.

Validates that required royalty payments occurred during transfers.

Updates compliance flags on Digital Certificates based on transfer legitimacy.

Provides compliance status to the RDA for eligibility determination.

The REM implements a multi-stage verification process to ensure Digital Certificate transfers comply with required royalty payments:

Transfer detection: The module continuously monitors transfer events across supported blockchains using protocol-specific event listeners.

Royalty validation: Upon detecting a transfer, the system retrieves the certificate's royalty configuration and calculates the required payment based on the transfer value and royalty basis points.

Payment verification: The system analyzes the blockchain transaction containing the transfer to verify that the specified royalty amount was paid to the designated recipient address.

Compliance flagging: Based on verification results, the system updates the certificate's compliance status in both the secure database and on-chain through a compliance bit in the certificate's metadata.

Eligibility enforcement: During reward distribution cycles, the Reward Distribution Algorithm checks each certificate's compliance status and excludes non-compliant certificates from rewards.

This technical implementation ensures that royalty rules are cryptographically enforced while maintaining the transferability of Digital Certificates, creating proper economic incentives for compliant behavior.

The REM implements several technical approaches to enforce royalties:

On-chain enforcement when supported by the underlying blockchain

Off-chain validation against transfer records and payment transactions

Compliance flagging for proper reward qualification

Authorization checks before reward distribution

Digital Certificates transferred without meeting royalty requirements are marked as non-compliant and become ineligible for subsequent reward distributions, creating a strong economic incentive for royalty compliance.

The implementation of the royalty enforcement logic can be described in pseudocode as follows:

```
# Pseudocode for royalty enforcement
def enforce_royalty(transfer_event):
    # Extract transfer details
    sender=transfer_event.from_address
    receiver=transfer_event.to_address
    certificate_id=transfer_event.token_id
    # Get royalty configuration for this Digital Certificate
    royalty_config=get_royalty_config(certificate_id)
    required_payment=calculate_required_payment(trans-
        fer_event.value, royalty_config)
    # Check for royalty payment in the transaction
    actual_payment=get_royalty_payment(transfer_event-
        .transaction_hash)
    if actual_payment>=required_payment:
        # Mark transfer as compliant
        update_compliance_status(certificate_id, True)
        emit_compliance_event(certificate_id,
            transfer_event.transaction_hash, True)
        return True
    else:
        # Mark transfer as non-compliant
        update_compliance_status(certificate_id, False)
        emit_compliance_event(certificate_id,
            transfer_event.transaction_hash, False)
        return False
```

1.6 User Dashboard and Interface

The User Dashboard, shown in FIG. 8, provides a unified interface for contributors to interact with the DeRev system. This interface offers:

Real-time Digital Certificate portfolio visibility showing current holdings and values.

Reward projection tools estimating upcoming distributions.

Historical reward data visualizing earnings over time.

Contribution metrics and performance indicators.

Compliant transfer tools with integrated royalty handling.

The dashboard abstracts the underlying technical complexity while surfacing key metrics and controls required for system participation.

Technical Implementation Details

Distributed Ledger Implementation

The DeRev system utilizes a protocol-agnostic architecture that enables deployment across multiple distributed ledger technologies while maintaining consistent business logic and security guarantees. As illustrated in FIG. 4, the implementation provides interoperability through modular adapters for various blockchain protocols:

Hedera Hashgraph Implementation

The primary implementation leverages Hedera Hashgraph's enterprise-grade infrastructure, which provides several technical advantages:

Hedera Token Service (HTS): Implementation of Digital Certificates as HTS Digital Certificates with:

Custom fractional royalties configurable at Digital Certificate creation

Native memo field support for Digital Certificate metadata storage or IPFS references Atomic swaps for compliant Digital Certificate transfers Transaction receipts with consensus timestamps for precise temporal calculations Hedera Consensus Service (HCS): Utilization of the consensus service for:

Tamper-evident logging of distribution events

Verifiable sequencing of contribution records

Transparent audit trails with cryptographic guarantees

Fair ordering of transactions with consensus timestamps

Hedera File Service (HFS): Storage of extended metadata when token memo field constraints apply:

Immutable storage of contribution schemas

Versioned parameter files for decay functions

Cryptographically linked metadata expansion for complex attribution models

Hedera Smart Contract Service: Execution of reward distribution logic through:

Gas-optimized batch transfers with Solidity contracts

Custom execution logic for complex distribution formulas

Programmatic enforcement of royalty and compliance rules

Cross-Protocol Compatibility

The system architecture includes modular adapters for additional distributed ledger technologies including:

Ethereum and EVM-Compatible Chains:

ERC-721 and ERC-1155 standard interfaces for Digital Certificates

Gas-optimized metadata storage patterns

EIP-2981 royalty standard implementation

Layer 2 optimizations for high-volume deployments

Solana Implementation:

SPL token program integration for Digital Certificates

Account-based Digital Certificate structure

Program-derived addresses for on-chain attribution

Transaction optimization for Solana's parallel execution model

Other Protocol Implementations:

Polkadot parachain compatibility

NEAR contract deployment pattern

Algorand smart contract integration

Cosmos IBC-compatible modules

Protocol Abstraction Layer

To achieve cross-protocol compatibility, the system implements a Protocol Abstraction Layer (PAL) [420] that normalizes interactions across different distributed ledgers.

The Protocol Abstraction Layer implements protocol-specific adapters that translate core system operations into native blockchain commands. Each adapter implements a standardized interface that includes createCertificate( ), transferCertificate( ), verifyRoyalty( ), and distributReward( ) functions, with protocol-specific implementations. For example, on Ethereum, certificates are implemented as ERC-721 tokens with extended metadata, while on Hedera, the native HTS non-fungible token service is utilized with semantic equivalence.

The abstraction layer maintains cryptographic consistency through protocol-appropriate signature schemes including ECDSA for Ethereum-compatible chains and EdDSA for protocols like Solana. Cross-chain identity resolution is handled through a deterministic mapping system that associates contributor identities across protocols while preserving protocol-native addressing. This allows a single logical Digital Certificate to be represented across multiple chains while maintaining consistent metadata and ownership.

Transaction Formation: Protocol-Specific Transaction Construction with:

Appropriate fee models (gas, transaction fees)

Signature scheme adaptations (ECDSA, EdDSA)

Idempotent operation encoding

Nonce management and transaction sequencing

State Verification: Unified State Proof Verification Across Protocols:

Merkle proof verification for Ethereum-like chains

State proof validation for Hedera state

Signature-based verification for Solana

Appropriate finality models per protocol

Handling: Normalized Event Capture and Processing:

Ethereum-style event logs

Hedera transaction receipts and record streams

Solana program logs

Protocol-specific notification mechanisms

Token Standard Bridging: Cross-Protocol Digital Certificate Representation:

Standard-compliant interface implementations

Protocol-specific metadata adaptations

Consistent royalty enforcement semantics

State synchronization for multi-chain deployments

The cross-chain signature verification is implemented through a protocol-specific adapter pattern:

```
// TypeScript implementation of cross-chain signature
    verification
interface SignatureVerifier {
verifySig(message: Uint8Array, signature: Uint8Array,
    publicKey: Uint8Array): boolean;
}
class Secp256k1Verifier implements SignatureVerifier {
    verifySig(message: Uint8Array, signature: Uint8Array,
        publicKey: Uint8Array): boolean {
        // Ethereum/Bitcoin style ECDSA verification
        return secp256k1.verify(
            secp256k1.keccak256(message),
            signature,
            publicKey
        )
    }
}
class Ed25519Verifier implements SignatureVerifier {
    verifySig(message: Uint8Array, signature: Uint8Array,
        publicKey: Uint8Array): boolean {
        // Solana/Cardano style EdDSA verification
        return ed25519.verify(message, signature, pub-
            licKey);
    }
}
// Protocol-agnostic verification function
function    verifyDigitalCertificate(certificate,    protocol-
    Type) {
    const verifier=getVerifierForProtocol(protocolType);
    const publicKey=getPublicKeyForIssuer(certificate.is-
        suer);
    return verifier.verifySig(
        encodeDigitalCertificateData(certificate),
        certificate.signature,
        publicKey
    );
}
```

This protocol-agnostic architecture enables the DeRev system to operate across heterogeneous blockchain environments while maintaining consistent business logic, security properties, and user experience regardless of the underlying distributed ledger technology.

Data Flow and Process Sequence

The complete data flow through the DeRev system follows a defined sequence as illustrated in FIG. 1:

Transaction Completion:
  Business transaction concludes (e.g., real estate sale closes)
  Transaction metadata captured (value, participants, commission amount)
  System validates transaction legitimacy
Commission Allocation:
  CAE applies allocation rules to determine DeRev portion
  Allocation recorded with cryptographic signatures
  Treasury account credited with allocated funds
Contribution Analysis:
  System identifies all contributing parties
  Contribution types classified (agent, consumer, referrer)
  Point values assigned based on contribution significance
Digital Certificate Issuance:
  DCIM issues Digital Certificates for each qualifying contributor
  Metadata embedded with contribution details
  Digital Certificates delivered to contributor wallets
Token Acquisition:
  TAM executes token buyback strategy
  Acquired tokens transferred to reward pool for distribution to Digital Certificate holders
  Transaction records created for audit purposes

16

Reward Calculation:
  During distribution cycle, RDA computes all Digital Certificate time-adjusted values
  Eligibility verification performed
  Token allocation calculated for each eligible Digital Certificate
Reward Distribution:
  Tokens transferred to eligible Digital Certificate holders using optimized transfer protocols
  Distribution records created with cryptographic proofs for all Digital Certificate reward transfers
  User dashboard updated with Digital Certificate information and reward status
Ongoing Monitoring:
  REM continuously monitors Digital Certificate transfers
  Compliance status updated based on transfer legitimacy
  System periodically recalculates decay-adjusted point values Technical Adaptations for Multi-Industry Deployment The DeRev system architecture supports multiple vertical applications through configurable adaptation layers, as illustrated in FIG. 7. These adaptations include:

Real Estate Implementation:
  Integration with Multiple Listing Service (MLS) and transaction management systems via APIs with standardized data transformation layers
  Commission structures aligned with standard agent splits using parameterized calculation models
  Referral attribution for agent-to-agent and consumer-to-agent paths with cryptographic verification chains Implementation Example

```java
// Java implementation for real estate commission calculation
public class RealEstateCommissionCalculator implements CommissionCalculator {
    @Override
    public CommissionAllocation calculateCommission(Transaction transaction) {
        // Validate transaction type
        if (!transaction.getType( ).equals("REAL_ESTATE")) {
            throw new InvalidTransactionTypeException("Not a real estate transaction");
        }
        // Extract transaction parameters
        BigDecimal salePrice = transaction.getAmount( );
        BigDecimal commissionRate = transaction.getCommissionRate( );
        String agentId = transaction.getAgentId( );
        // Calculate total commission
        BigDecimal totalCommission = salePrice.multiply(commissionRate);
        // Apply standard real estate split model (agent/platform)
        BigDecimal agentCommission = totalCommission.multiply(new BigDecimal("0.80"));
        BigDecimal platformCommission = totalCommission.multiply(new
BigDecimal("0.20"));
        // Calculate DeRev allocation
        BigDecimal derevRevenue = platformCommission.multiply(new BigDecimal("0.75"));
        BigDecimal tokenAcquisition = platformCommission.multiply(new
BigDecimal("0.25"));
        return new CommissionAllocation(
            agentId,
            totalCommission,
            agentCommission,
            platformCommission,
            derevRevenue,
            tokenAcquisition
        );
    }
}
```

Automotive Retail and Service:

Integration with dealer management systems (DMS) through secure API endpoints

Attribution for sales, finance, and service referrals with multi-party point allocation Tracking for warranty and aftermarket service commissions with extended temporal parameters Specialized metadata extensions for vehicle identification number (VIN)-linked transactions SaaS and Affiliate Programs:

API integration with subscription management platforms

Multi-tier referral tracking for partner ecosystems with hierarchical point attribution Recurring revenue attribution for subscription models with time-series adjustment algorithms Implementation of Enhanced Decay Functions for SaaS LTV Models:

```
# Python implementation of enhanced SaaS decay func-
    tions
def calculate_saas_token_value(original_points, subscrip-
tion_params):
    Calculate SaaS contribution value with specialized decay
    accounting for subscription lifetime value
    Parameters:
        original_points (float): Initial point allocation
        subscription_params (dict): Subscription parameters
    Returns:
        float: Adjusted point value
        # Extract parameters
        months_active=subscription_params['months_active']
        churn_probability=subscription_params['churn_prob-
            ability']
        monthly_revenue=subscription_params['monthly_rev-
            enue']
        # Calculate expected lifetime
        expected_lifetime=1/churn_probability
        # Apply specialized decay function for SaaS
        if months_active <3:
            # Initial period—full value
            return original_points
        elif months_active <expected_lifetime:
            # Middle period—gradual decay
            decay_factor=1-((months_active-3)/(expected_life-
                time*2))
            return original_points*max(0.5, decay_factor)
        else:
            # Long-term period—residual value
            return original_points*0.5
```

B2B Marketplaces:

API integration with procurement and sourcing platforms

Multi-touch attribution for complex buying committees with weighted contribution models Deal-specific commission structures with dynamic temporal adjustment Special handling for long sales cycles with milestone-based point allocation Healthcare Referral Networks:

HIPAA-compliant data handling with enhanced privacy controls

Provider-to-provider referral attribution using zero-knowledge proof systems

Outcome-based adjustment factors for value-based care models

Private metadata storage with selective disclosure mechanisms

The system's modular design allows for industry-specific implementations while maintaining core functionality across verticals, with each vertical implementation extending the base system through specialized adaptation layers for Digital Certificate metadata and processing.

2.4 Technical Security and Compliance Features

The DeRev system incorporates multiple security and compliance measures:

2.4.1 Data Security:

End-to-end encryption for sensitive transaction data using AES-256 with secure key management Cryptographic signatures for allocation records with tamper-evident storage Secure key management for treasury and distribution wallets using threshold signatures Role-based access control for administrative functions with least-privilege principles Regulatory Compliance:

Configurable AML/KYC integration for high-value transactions through standardized APIs Audit trail generation for all system operations with cryptographic guarantees Compliance reporting capabilities for tax and regulatory purposes Data retention policies aligned with industry requirements and privacy regulations Operation Security:

Multi-signature requirements for treasury operations with m-of-n threshold schemes Threshold approvals for parameter modifications with time-locked execution Automated anomaly detection for unusual patterns with machine learning models Regular security audits and penetration testing protocols Multi-Vertical Applications The DeRev system architecture is designed for extensibility across multiple commission-driven and referral-based verticals. As illustrated in FIG. 7, implementation patterns have been developed for:

Real Estate Transactions

In Real Estate Applications, the System Tracks:

Agent-driven transactions with variable commission structures

Buyer and seller participation in closed deals

Referral relationships between agents and brokerages

Property-specific metadata for transaction categorization

A complete transaction flow in the real estate vertical would include:

Property sale closes with commission payment

System computes agent split and platform allocation

Platform allocation divided between revenue and token acquisition

Digital Certificates minted for agent, buyer, and seller with property metadata

Token acquisition process executed on exchanges

Periodic reward distributions based on Digital Certificate holdings

Automotive Retail and Service

For automotive implementations, the system adapts to:

Dealership sales attribution with multiple contributing roles

Service referrals and warranty activations

F&I product sales with variable commission structures

Multi-location attribution for dealer groups

The Digital Certificate metadata is extended with automotive-specific fields:

```
{
    "@context": "https://schema.org/",
    "@type": "DigitalCertificate",
```

```
"certificateType": "SERVICE_PROVIDER",
"pointValue": 85.50,
"issuanceTimestamp": "2023-09-12T10:45:33.123Z",
"transactionDigest":
    "0xd45f2a7b8c9e1d3f6a2b8c9d0e1f2a3b4c5d6e7f8a
    9bOc1d2e3f4a5b6c7d8e9f",
"royaltyBasisPoints": 200,
"protocol": "ethereum",
"protocolVersion": "10.0.0",
contributionDetails": {
"transactionValue": 45000.00,
"commissionAmount": 1350.00,
"contributorRole": "finance_manager",
"vehicleInfo": {
    "vin": "1HGCM82633A123456",
    "make": "Toyota",
    "model": "Camry",
    "year": 2023,
    "saleType": "new"
},
"dealershipInfo": {
    "name": "Metro Auto Group",
    "location": "Austin, TX,
    "dealerId": "MAG001"
}
}
}
}
```

Affiliate-Driven SaaS

In the SaaS vertical, the system issues Digital Certificates for subscription-based transactions with specialized metadata and decay functions:

Multi-tier partner referral networks with Digital Certificate-based attribution

Residual commission structures for subscription products

Usage-based compensation models

Integration with license management systems

B2B Marketplaces

For business marketplace applications, the system enables Digital Certificate-based tracking of:

Complex lead-generation attribution through Digital Certificates

Multi-touch contribution tracking with weighted point allocation

Closed-loop transaction verification

Integration with procurement systems

Healthcare Referral Networks

In healthcare settings, the system provides Digital Certificate-based attribution for:

Provider-to-provider referral tracking

Patient attribution models

Outcome-based incentive structures

HIPAA-compliant data handling

Financial Services

For financial applications, the system adapts to:

Advisory referral networks

Product sales attribution

Client acquisition tracking

Compliance with financial regulations

Technical Benefits and Advantages

The DeRev system provides several technical advantages over traditional commission and referral systems:

Cryptographic Verification

Traditional systems rely on centralized databases vulnerable to modification. DeRev's use of cryptographic signatures and optional blockchain recording creates tamper-resistant records of contributions and rewards.

The cryptographic verification process includes:

Creation of contribution records with standardized metadata fields

Generation of cryptographic hash of contribution record contents

Signing of hash with issuer's private key using EIP-712 typed data format

Storage of signature alongside record data in the contribution certificate

Verification of signature using issuer's public key

This process ensures that:

Records cannot be modified after creation without detection

Contribution claims can be independently verified

Third parties can validate attribution without trusted intermediaries

Computational Efficiency

Manual commission calculations are error-prone and time-consuming. DeRev's algorithmic approach provides real-time, accurate distributions even across complex multiparty transactions.

The system achieves this through:

O(log n) complexity for certificate querying using sparse Merkle trees

Optimized batch processing for reward calculations

Parallel computation of time-decay adjustments

Efficient state management for large-scale distribution operations

These optimizations enable the system to process thousands of contributor records in seconds, compared to hours or days for manual reconciliation.

Dynamic Incentive Alignment

Static commission structures fail to account for the diminishing impact of contributions over time. DeRev's time-decay functions create more economically balanced incentives that better reflect business realities.

The system implements multiple parametrized time-decay functions optimized for commission distribution fairness. For example, the linear decay function $D\_lin(t)=max(0, 1-(t/T\_max))$ applies uniform decay over the time period $T\_max$, while the exponential decay function $D\_exp(t)=e^{(-\lambda t)}$ applies accelerated early decay with a longer tail using decay constant $\lambda$. The parametric decay function $D\_param(t)=(1+(t/T\_ref)^\beta)^{(-\alpha)}$ provides flexible curve-shaping through adjustable parameters $\alpha$ and $\beta$, enabling precise tuning of decay profiles to match specific business verticals and market behaviors.

These mathematical models are encoded within the Digital Certificate metadata using standardized fields and are processed by the Reward Distribution Algorithm. For example, a real estate referral might use exponential decay with a half-life of 6 months ($\lambda=0.1155$), while a SaaS subscription referral might use parametric decay with $\alpha=0.8$ and $\beta=1.2$ to account for recurring value. The system dynamically computes the current point value at distribution time by applying these functions to the elapsed time since certificate issuance.

The time-decay mechanisms allow for:

Accurate modeling of contribution value over time

Configurable decay parameters aligned with business objectives

Mathematical representation of diminishing returns

Automated adjustment without manual intervention

This dynamic approach creates alignment between contribution timing and reward distribution, encouraging continued engagement with the platform.

Attribution Precision

Legacy systems struggle with proper credit allocation in multi-touch scenarios. DeRev's point-based attribution model enables fine-grained, mathematically sound distribution of rewards among multiple contributors.

The attribution system provides:

Hierarchical contribution classification

Weighted point allocation based on contribution type

Transparent calculation of relative contributions

Fair distribution across complex transaction networks

This precision eliminates disputes over attribution and ensures fair compensation for all parties.

Cross-Platform Portability

Traditional commission histories are siloed within specific platforms. DeRev's Digital Certificate-based contribution records remain portable across ecosystems, creating persistent reputation assets.

The portability features include:

Standardized metadata formats for cross-platform interpretation

Protocol-agnostic token representations

URI-addressable contribution records

Interoperable verification methods

This portability allows contributors to maintain their contribution history across multiple systems and platforms.

Programmatic Compliance

Manual compliance checks are inconsistent and resource-intensive. DeRev's automated royalty enforcement and eligibility verification ensures systematic rule application.

The compliance system includes:

Automated detection of Digital Certificate transfers

Validation of royalty payments

Compliance status tracking

Eligibility determination for reward distribution

This automation reduces administrative overhead while increasing compliance rates through economic incentives.

Hybrid On-Chain/Off-Chain Architecture

The DeRev system implements a secure one-way data diode architecture to enforce strict separation between sensitive estimation/transaction data and public blockchain records. This security pattern ensures that confidential information flows only from secure databases to the blockchain reward layer, never in reverse.

The implementation uses a unidirectional communication channel with cryptographic verification but no return path. When reward information is published to the blockchain, only the minimal required data (token amounts, recipient addresses, and cryptographic proofs) passes through this channel. The source transaction data, including commission amounts, personal details, and business-sensitive information, remains in encrypted databases with role-based access controls.

This architectural pattern provides stronger security guarantees than traditional API-based integrations by physically enforcing the data flow direction at the infrastructure level, preventing both accidental data exposure and intentional exfiltration attempts.

Comparative Analysis

The DeRev system provides several technical advantages over existing approaches:

| Technical Feature | Prior Approaches | DeRev System Improvement |
| --- | --- | --- |
| Computational Efficiency | $O(n^2)$ complexity in multi-party calculations requiring complete recalculation for each distribution | $O(\log n)$ complexity through merkleized contribution trees with optimized partial updates |
| Data Privacy | All transaction data stored on-chain or all data kept in centralized databases | Hybrid architecture with cryptographically secure one-way data diode separating sensitive data from blockchain rewards |
| Time-Value Adjustment | Fixed expiration dates or manual adjustments | Programmable mathematical decay functions with configurable parameters for different business contexts |
| Protocol Compatibility | Single-chain implementation or complex cross-chain bridging | Protocol-agnostic abstraction layer with native adapters for each supported blockchain |
| Royalty Enforcement | Voluntary compliance or marketplace-specific rules | Automated compliance verification with eligibility consequences for non-compliant transfers |

These improvements enable the system to process larger contributor networks, maintain higher security standards, and operate across diverse blockchain ecosystems while ensuring fair, mathematically rigorous reward distribution.

The invention claimed is:

1. A computerized system for cryptographically secure management of token-based reward distribution in multiparty transactions, the system comprising: a commission allocation engine implemented on one or more processors with distributed computing architecture and configured to: receive transaction data comprising at least transaction value, commission amount, and contributor identifiers, execute a parameterized allocation algorithm that computes distribution coefficients according to configurable parameters stored in a secure parameter data store, cryptographically sign allocation records using an asymmetric ECDSA key pair with 256-bit security to create tamper-evident distribution instructions, and generate an audit log of all allocation operations with sequential hash linking for tamper detection; a token acquisition module implemented on one or more processors with parallel processing capability and configured to: establish secure API connections to a plurality of digital token exchanges using TLS 1.3 protocol with mutual certificate authentication, execute a multi-parametric optimization algorithm that minimizes acquisition costs by solving the constraint equation $\min(\Sigma(P_i \cdot V_i) + \Sigma(G_i) + \Sigma(S_i))$ where $P_i$ represents price, $V_i$ represents volume, $G_i$ represents gas cost, and $S_i$ represents slippage at exchange i, implement temporal distribution of acquisition volume according to a volume-weighted average price (VWAP) formula expressed as $VWAP = \Sigma(P_i \cdot V_i)/\Sigma(V_i)$ with time distribution function $V = (V\_total \cdot f(t))/\int f(t)dt$, and store acquired digital tokens in hierarchical deterministic wallets implementing BIP-32/BIP-39/BIP-44 standards with m-of-n multi-signature security requiring at least two authorized signatories for withdrawal operations; a digital certificate issuance module implemented on one or more processors with hardware security element and configured to: programmatically generate non-fungible Digital Certificates compatible with multiple distributed ledger protocols including Hedera Token Service (HTS), Ethereum token standards (ERC-721 and ERC-1155), and other blockchain token systems upon cryptographic verification of qualifying transactions, assign generated digital certificates to cryptographic addresses associated with transaction contributors using public-key cryptography compatible with multiple cryptographic curves including secp256k1 and Ed25519, embed standardized JSON-LD metadata within each digital certificate comprising at least hierarchical contribution type classification according to a predefined taxonomy, mathematically weighted point value calculated according to contribution significance, millisecond-precision issuance timestamp encoded in ISO 8601 format, and cryptographic hash of the source transaction for verification purposes, and implement batched certificate issuance operations to optimize gas utilization on gas-metered blockchain networks; a reward distribution module implemented on one or more processors with dedicated memory cache and configured to: apply a parameterized mathematical time-decay function selected from linear decay expressed as $D\_lin(t)=\max(0, 1-(t/T\_max))$, exponential decay expressed as $D\_exp(t)=e^{(-\lambda t)}$, step-function expressed as $D\_step(t)=\{1.0\ if\ t<T_1, C_1\ if\ T_1\leq t<T_2, C_2\ if\ T_2\leq t<T_3, \ldots, C_n\ if\ t\geq T_n\}$, and parametric decay expressed as $D\_param(t)=(1+(t/T\_ref)^\beta)^{(-\alpha)}$ to digital certificate point values, cryptographically verify compliance with royalty requirements through transaction history analysis using a binary eligibility function $\varepsilon(Certificate\_id)=\{1\ if\ compliance\_verification(Certificate\_id)=TRUE, 0\ otherwise\}$, execute a computationally optimized proportional allocation algorithm with O(n) complexity to calculate token reward distributions using the formula $R\_i=P\cdot AP\_i/(\Sigma_i AP\_J)$ where $R\_i$ is the reward amount for Certificate_i, P is the total reward pool size, $AP\_i$ is the adjusted points calculated as $E(Certificate\_i)\cdot OP\_i\cdot D(t\_i)$, and implement protocol-optimized batch transfer operations for distributing tokens to eligible digital certificate holders using merkleized proof of allocation for gas efficiency; and a hybrid data management system implemented on one or more processors with encrypted storage and configured to: store sensitive transaction data and personally identifiable information in an encrypted off-chain database with role-based access controls using AES-256 encryption, record cryptographic proofs of reward distributions as Merkle-tree hashes on a distributed ledger using sequential hash linking, and implement a two-level caching system for Digital Certificate state with block-height based invalidation strategy to minimize redundant blockchain queries.

2. The system of claim 1, wherein the commission allocation engine is configured to allocate a percentage of transaction revenue from real estate, automotive, insurance, or financial service transactions.

3. The system of claim 1, wherein the token acquisition module implements a volume-weighted average price (VWAP) acquisition strategy across multiple exchanges.

4. The system of claim 1, wherein the Digital Certificate issuance module is configured to mint distinct Digital Certificate types for agents, consumers, and referrers associated with each transaction.

5. The system of claim 1, wherein the time-based decay function comprises at least one of: a linear decay function expressed as $\max(0, 1-(t/T\_max))$, where t represents elapsed time and T_max represents maximum time period; an exponential decay function expressed as $e^{(-\lambda t)}$, where $\lambda$ represents a decay rate constant; a step function with predefined values at time thresholds; or a parametric curve expressed as $(1+(t/T\_ref)^\beta)^{(-\alpha)}$, where T_ref represents a reference time period and $\alpha$ and $\rho$ represent shape parameters.

6. The system of claim 1, further comprising a royalty enforcement module configured to monitor Digital Certificate transfers and update compliance status based on adherence to royalty requirements.

7. The system of claim 6, wherein the royalty enforcement module is configured to mark Digital Certificates as ineligible for reward distribution when transferred without required royalty payments.

8. The system of claim 1, wherein the data management system stores personally identifiable information (PII) and sensitive transaction details off-chain while recording cryptographic proofs of reward distribution on-chain.

9. The system of claim 1, further comprising a user dashboard configured to display: Digital Certificate holdings and associated metadata; historical and projected reward distributions based on Digital Certificate holdings; compliance status of owned Digital Certificates; and transfer tools with integrated royalty handling.

10. A computer-implemented method for cryptographically secure allocation of token-based rewards to contributors in multi-party transactions, the method comprising: receiving, by one or more processors configured with transaction verification hardware, a cryptographically signed transaction record comprising transaction value, commission structure, and contributor identifiers; validating, by the one or more processors, the authenticity of the transaction record by verifying the cryptographic signature using public key cryptography and confirming the record integrity through hash verification; executing, by the one or more processors, a parameterized allocation algorithm that programmatically directs a configurable percentage of transaction revenue to a distributed ledger-controlled reward pool according to the formula $A=\Sigma(C_i\cdot w_i)\cdot\alpha$, where A is the allocated amount, $C_i$ is commission component i, $w_i$ is the weight coefficient for component i, and $\alpha$ is the allocation percentage parameter, wherein the algorithm performs the following steps: (a) extracting the individual commission components from the transaction data, (b) applying the corresponding weight coefficients to each component based on transaction type, (c) computing the weighted sum of all components, and (d) multiplying by the allocation percentage parameter to derive the final allocation amount; implementing, by the one or more processors configured with secure API communication hardware, a multi-exchange acquisition protocol that acquires digital tokens using the allocated revenue through the following technical steps: (a) establishing secure connections to multiple digital token exchanges using TLS 1.3 protocol, (b) retrieving real-time pricing and liquidity data from each exchange, (c) computing an optimal acquisition strategy using the constraint optimization algorithm $\min(\Sigma(P_i\cdot V_i)+\Sigma(G_i)+\Sigma(S_i))$, (d) executing token acquisition operations with cryptographically signed API requests, and (e) verifying the completion of acquisition transactions through receipt verification; generating, by the one or more processors configured with specialized cryptographic processing hardware, protocol-compatible non-fungible Digital Certificates for each contributor identified in the transaction record, wherein the Digital Certificates conform to at least one distributed ledger token standard selected from Hedera Token Service (HTS) Digital Certificates, Ethereum token standards (ERC-721 and ERC-1155), Solana Program Library (SPL) tokens, and other distributed ledger token implementations, through the following technical steps: (a) selecting the appropriate token standard based on protocol configuration, (b) constructing the certificate creation transaction according to protocol-specific requirements, (c) signing the transaction using the issuing authority's private key, and (d) submitting the transaction to the corresponding distributed ledger network; embedding, by the one or more processors, standardized JSON-LD metadata within each digital certificate comprising contribution type classification according to a predefined ontology, mathematically computed point value derived from contribution parameters, cryptographically verifiable timestamp encoded as Unix epoch time with millisecond precision, and digital signature of the issuing authority to verify authenticity, wherein the embedding process involves: (a) constructing a structured JSON-LD document according to the standardized schema, (b) computing the point value using the formula $P=B \cdot M \cdot F$, where B is the base point value, M is the multiplier based on contribution type, and F is the factor based on transaction significance, (c) generating a cryptographic signature over the metadata using the EIP-712 typed data standard, and (d) storing the metadata and signature either on-chain or via content-addressed storage with on-chain reference; applying, by the one or more processors configured with mathematical computation hardware, a parameterized time-decay function to each digital certificate's point value, the function selected from: (a) linear decay expressed as $D\_lin(t)=max(0, 1-(t/T\_max))$, where t is the time elapsed since issuance and T_max is the maximum time period, (b) exponential decay expressed as $D\_exp(t)=e^{\hat{}}(-\lambda t)$, where $\lambda$ is the decay rate constant defined as $\ln(2)/t\_half$, (c) step function expressed as $D\_step(t)=\{1.0$ if $t<T_1$, $C_1$ if $T_1 \le t<T_2$, $C_2$ if $T_2 \le t<T_3, \ldots, C_n$ if $t \ge T_n\}$, where $T_i$ are threshold timestamps and $C_i$ are coefficient values, or (d) parametric decay expressed as $D\_param(t)=(1+(t/T\_ref)^{\hat{}}\beta)^{\hat{}}(-\alpha)$, where T_ref is a reference time period and $\alpha$ and $\beta$ are shape parameters; executing, by the one or more processors, a cryptographic verification protocol that confirms the digital certificate's eligibility based on transaction history analysis and royalty compliance verification executing, by the one or more processors, a cryptographic verification protocol that confirms the digital certificate's eligibility based on transaction history analysis and royalty compliance verification through the following technical steps: (a) retrieving the certificate's transfer history from the distributed ledger, (b) analyzing each transfer event for required royalty payments, (c) calculating the compliance status using the binary eligibility function $\varepsilon(Certificate\_id)=\{1$ if compliance_verification (Certificate_id)=TRUE, 0 otherwise}, and (d) recording the verification result in a secure, append-only log; computing, by the one or more processors using parallel processing architecture, each eligible digital certificate's proportional share of the reward pool through the following technical steps: (a) retrieving all eligible certificates using O(log n) complexity sparse Merkle tree indexing, (b) calculating each certificate's adjusted point value by applying the time-decay function and eligibility verification, (c) computing the sum of all adjusted points in parallel using a map-reduce algorithm, (d) calculating each certificate's proportional share using the formula $R\_i=P \cdot (AP\_i/\Sigma(AP\_j))$, where R_i is the reward for digital certificate i, P is the total reward pool, AP_i is the adjusted points for digital certificate i, and $\Sigma(AP\_j)$ is the sum of all adjusted points; and implementing, by the one or more processors configured with blockchain interaction hardware, a protocol-optimized batch distribution operation that transfers tokens to cryptographic wallet addresses of eligible contributors through the following technical steps: (a) constructing a merkleized proof of allocation for efficient verification, (b) organizing transfers to minimize gas consumption through optimized transaction ordering, (c) executing batch transfers using protocol-appropriate methods such as ERC-20 transferFrom( ) or EIP-1155 batch transfer, and (d) verifying the completion of all transfers through transaction receipt validation.

11. The method of claim 10, wherein the contributor types include at least agent, consumer, and referrer roles with distinct contribution classifications.

12. The method of claim 10, wherein the decay function reduces the Digital Certificate's point value according to a mathematical formula based on time elapsed since issuance, with configurable parameters adjustable per vertical implementation.

13. The method of claim 10, further comprising recording reward distribution metadata on a distributed ledger with tamper-evident properties.

14. The method of claim 10, wherein Digital Certificates transferred without meeting required royalty payments are disqualified from receiving rewards through an automated compliance verification process.

15. The method of claim 10, further comprising exposing an application programming interface (API) that enables integration with external transaction management systems through standardized data exchange protocols.

16. The method of claim 10, further comprising adapting the metadata structure and point value calculation based on industry-specific transaction characteristics through configurable attribute mappings.

17. The method of claim 10, wherein allocating the portion of transaction revenue comprises one of: a fixed percentage allocation, a tiered allocation based on transaction value, or a dynamic allocation based on transaction characteristics.

18. A non-transitory computer-readable medium storing instructions that, when executed by a processor with specialized cryptographic acceleration hardware, cause the processor to perform operations for managing a protocol-agnostic digital certificate and reward system, the operations comprising: receiving transaction data including transaction value, commission amount, commission structure, and contributor identifiers through a secure API gateway implementing TLS 1.3 encryption; validating transaction authenticity by verifying cryptographic signatures using public key infrastructure (PKI) with support for multiple signature schemes including ECDSA and EdDSA; calculating a reward pool allocation based on predefined allocation rules using the formula $A=\Sigma(C_i \cdot w_i) \cdot \alpha$, where A is the allocated amount, $C_i$ is commission component i, $w_i$ is the weight coefficient for component i, and $\alpha$ is the allocation percentage parameter; generating distributed ledger-compatible Digital Certificates conforming to at least one token standard selected from Hedera Token Service (HTS) specifications, Ethereum token standards (ERC-721 and ERC-1155), Solana Program Library (SPL) token specifications, and other distributed ledger non-fungible token implementations, with protocol-specific optimizations for gas efficiency and throughput; embedding standardized metadata within the digital certificates using JSON-LD schema definitions that include: (a) @context field pointing to a standardized schema definition, (b) @type field identifying the certificate type, (c) hierarchical contribution classification according to predefined taxonomy, (d) mathematically computed point value derived from transaction parameters, (e) ISO 8601 formatted timestamp with millisecond precision, and (f) cryptographic signature for data authenticity verification; assigning the digital certificates to cryptographic addresses associated with transaction contributors using public-key based addressing compatible with multiple cryptographic curves including secp256k1 and Ed25519; executing a cryptographically secured token acquisition process across multiple liquidity sources by: (a) establishing secure connections to multiple token exchanges, (b) implementing a volume-weighted average price (VWAP) acquisition strategy, (c) optimizing acquisition cost using the constraint equation $\min(\Sigma(P_i \cdot V_i) + \Sigma(G_i) + \Sigma(S_i))$, (d) fragmenting large orders to minimize market impact, and (e) verifying transaction execution through cryptographic receipt validation; applying a configurable mathematical time-decay function to certificate point values according to elapsed time since issuance, selected from: (a) linear decay expressed as $D\_lin(t) = \max(0, 1 - (t/T\_max))$, (b) exponential decay expressed as $D\_exp(t) = e^{(-\lambda t)}$, (c) step function with predefined thresholds and coefficients, or (d) parametric decay expressed as $D\_param(t) = (1 + (t/T\_ref)^{\beta})^{(-\alpha)}$, wherein each function's parameters are configurable per implementation vertical; verifying certificate compliance status through cryptographic proofs by: (a) analyzing transfer history for required royalty payments, (b) validating payment transactions through cryptographic receipt verification, (c) computing compliance status using a binary eligibility function, and (d) storing verification results in a tamper-evident data structure; calculating proportional reward allocations using an optimized distribution algorithm with $O(n)$ complexity implementing the formula $R\_i = P \cdot (AP\_i/\Sigma(AP\_j))$, where $R\_i$ is the reward for digital certificate i, P is the total reward pool, $AP\_i$ is the adjusted points calculated as $\varepsilon(Certificate\_i) \cdot OP\_i \cdot D(t\_i)$, and $\Sigma(AP\_j)$ is the sum of all adjusted points; and executing protocol-appropriate token distribution operations to eligible certificate holders through the corresponding distributed ledger networks, with protocol-specific optimizations including: (a) batched transfers for gas efficiency, (b) merkleized proofs for efficient verification, (c) optimal transaction ordering to minimize state changes, and (d) receipt verification for transaction finality confirmation.

*     *     *     *     *